US007953538B2

(12) United States Patent
Matsubara et al.

(10) Patent No.: US 7,953,538 B2

(45) Date of Patent: May 31, 2011

(54) CONTROL APPARATUS FOR VEHICULAR DRIVE SYSTEM

(75) Inventors: Tooru Matsubara, Toyota (JP); Atsushi Tabata, Okazaki (JP); Koichiro Muta, Okazaki (JP); Masakazu Kaifuku, Okazaki (JP); Hidenori Katoh, Nishio (JP); Tomokazu Nomura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 871 days.

(21) Appl. No.: 11/979,443

(22) Filed: Nov. 2, 2007

(65) Prior Publication Data

US 2008/0114522 A1 May 15, 2008

(30) Foreign Application Priority Data

Nov. 9, 2006 (JP) ................................ 2006-304615

(51) Int. Cl.
*G06G 7/63* (2006.01)
*B60W 10/08* (2006.01)

(52) U.S. Cl. .................. 701/99; 701/54; 701/67; 477/8; 477/20; 477/77; 477/83; 474/70

(58) Field of Classification Search .................... 701/51, 701/54, 67, 69, 82, 84, 99, 101; 477/7, 8, 477/15, 20, 31, 34, 68, 70, 73, 77, 83, 107, 477/115; 475/2, 5, 149; 474/18, 69, 70
See application file for complete search history.

(56) References Cited

U.S. PATENT DOCUMENTS

| | | | | |
|---|---|---|---|---|
| 5,038,883 | A * | 8/1991 | Kushi et al. | 180/197 |
| 6,078,859 | A * | 6/2000 | Jastrzebski et al. | 701/93 |
| 7,267,632 | B2 | 9/2007 | Ochiai et al. | |
| 7,833,119 | B2 * | 11/2010 | Klemen et al. | 475/5 |
| 2001/0034572 | A1 * | 10/2001 | Yamaguchi et al. | 701/22 |
| 2004/0209719 | A1 * | 10/2004 | Ochiai et al. | 474/18 |
| 2005/0209760 | A1 * | 9/2005 | Tabata et al. | 701/53 |
| 2005/0245350 | A1 * | 11/2005 | Tabata et al. | 477/34 |
| 2006/0017414 | A1 * | 1/2006 | Joe et al. | 318/432 |
| 2006/0128523 | A1 * | 6/2006 | Yamamoto et al. | 477/110 |
| 2006/0243502 | A1 * | 11/2006 | Weber et al. | 180/65.3 |
| 2006/0276289 | A1 * | 12/2006 | Hirata et al. | 475/5 |
| 2007/0107961 | A1 * | 5/2007 | Iwanaka et al. | 180/65.6 |

FOREIGN PATENT DOCUMENTS

| | | |
|---|---|---|
| JP | A-2004-125010 | 4/2004 |
| JP | A-2004-316843 | 11/2004 |
| JP | A 2005-264762 | 9/2005 |

* cited by examiner

*Primary Examiner* — Thomas G Black
*Assistant Examiner* — Ce Li
(74) *Attorney, Agent, or Firm* — Oliff & Berridge, PLC

(57) ABSTRACT

A control apparatus for a vehicular drive system including an electric differential portion and a mechanical power transmitting portion which are disposed in series in a power transmitting path between an engine and a drive wheel of a vehicle, the control apparatus being configured to limit an output of the engine according to a difference between an actual rotating speed of an input rotary member of the mechanical power transmitting portion, and a theoretical rotating speed calculated from an actual vehicle speed and a presently established speed ratio of the mechanical power transmitting portion, whereby reduction of torque capacity of an input clutch provided in the mechanical power transmitting portion does not cause an excessive rise of the rotating speed of a rotary member which is located on one side of the input clutch nearer to the engine, and an excessive rise of the rotating speed of an electric motor connected to the input rotary member.

24 Claims, 16 Drawing Sheets

SPEED LIMITING CONTROL ROUTINE
S1 SHIFT LEVER PLACED IN ANY DRIVE POSITION ? — YES / NO
S2 $\Delta N_{IN} > \Delta N_{IN}A$ — YES / NO
S3 REDUCING UPPER LIMIT Temax OF ENGINE OUTPUT TORQUE TO Temax2
S4 CONTROLLING FIRST ELECTRIC MOTOR M1 SO AS TO REDUCE SPEED NM2 OF SECOND ELECTRIC MOTOR M2
S5 HOLDING UPPER LIMIT Temax AT NORMAL VALUE Temax1
S6 OTHER CONTROLS
RETURN

| | C1 | C2 | B1 | B2 | B3 | SPEED RATIO | STEPPING RATIO |
|---|---|---|---|---|---|---|---|
| 1st | ○ | | | | ○ | 3.357 | 1.54 |
| 2nd | ○ | | | ○ | | 2.180 | 1.53 |
| 3rd | ○ | | ○ | | | 1.424 | 1.42 |
| 4th | ○ | ○ | | | | 1.000 | SPREAD 3.36 |
| R | | ○ | | | ○ | 3.209 | |
| N | | | | | | | |

○ ENGAGED

CONTROL APPARATUS FOR VEHICULAR DRIVE SYSTEM

CROSS REFERENCE TO RELATED APPLICATION

The present application claims priority from Japanese Patent Application No. 2006-304615, which was filed on Nov. 9, 2006, the disclosure of which I herein incorporated by reference in its entirety.

BACKGROUND OF THE INVENTION

1. Field of the Invention

The present invention relates to a control apparatus for a vehicular drive system including an electric differential portion and a mechanical power transmitting portion which are disposed in series with each other in a power transmitting path between an engine and a drive wheel of a vehicle, and more particularly to techniques for limiting rotating speeds of input members of the mechanical power transmitting portion in the event of a failure of a coupling device of the mechanical power transmitting portion during running of the vehicle, and for thereby assuring high durability of those input members.

2. Discussion of Prior Art

There is known a vehicular drive system including an electric differential portion and a mechanical power transmitting portion which are disposed in series with each other in a power transmitting path arranged to transmit an output of an engine to a drive wheel of the vehicle. JP-2005-264762A discloses an example of such a drive system for a hybrid vehicle. This vehicular drive system includes a power transmitting member for transmitting a vehicle drive force from an engine to the mechanical power transmitting portion through the electric differential portion, and a second electric motor disposed in a power transmitting path between the power transmitting member and the drive wheel. The mechanical power transmitting portion is a step-variable automatic transmission mechanism which is arranged to change the rotating speed of its input rotary member in steps while the vehicle drive force is received by the input rotary member from the engine through the power transmitting member.

The vehicular drive system as disclosed in the above-identified publication uses the mechanical power transmitting portion provided with a coupling device such as an input clutch, through which the vehicle drive force received from the electric differential portion is transmitted to the drive wheel from the mechanical power transmitting portion.

When a torque capacity of the coupling device such as the input clutch is reduced in the event of a failure of the coupling device or any component provided to control the coupling device during running of the vehicle at a comparatively high speed, there is a possibility that an input rotary member of the mechanical power transmitting portion disposed on one side of the coupling device that is nearer to the engine is rotated at an excessively high speed.

SUMMARY OF THE INVENTION

The present invention was made in view of the background art discussed above. It is therefore an object of this invention to provide a control apparatus for such a vehicular drive system as described above, which is configured to limit the rotating speed of the input rotary member of the mechanical power transmitting portion disposed on the side of the coupling device nearer to the engine, when the torque capacity of the coupling device of the power transmitting portion is reduced in the event of a failure of the coupling device during running of the vehicle.

The object indicated above can be achieved according to any one of the following modes of this invention:

(1) A control apparatus for a vehicular drive system including an electric differential portion and a mechanical power transmitting portion which are disposed in series in a power transmitting path between an engine and a drive wheel of a vehicle, the control apparatus being configured to limit an output of the engine according to a difference between an actual rotating speed of the mechanical power transmitting portion, and a theoretical rotating speed estimated from a presently established speed ratio of the mechanical power transmitting portion.

The control apparatus constructed according to the above-described mode (1) of the invention, which is configured to limit the output of the engine according to the difference between the actual rotating speed of the mechanical power transmitting portion and the above-indicated theoretical rotating speed, is effective to reduce or prevent an excessive rise of the rotating speed of a rotary member of the mechanical power transmitting portion disposed on one side of a coupling device nearer to the engine, and excessive rises of the rotating speeds of a bearing rotated with the rotary member and an electric motor connected to the rotary member, even in the event of reduction of torque capacity of the coupling device due to some abnormality of the coupling device, thereby making it possible to assure high durability of those rotary member, bearing and electric motor.

(2) The control apparatus according to the above-described mode (1), comprising engine-output limiting means configured to limit the output of the engine such that an upper limit value of the output is smaller when the above-indicated difference is larger than a predetermined threshold, than when the difference is not larger than the predetermined threshold value.

According to the above-described mode (2) wherein the control apparatus comprises the engine-output limiting means, this engine-output limiting means effectively reduces or prevents the excessive rise of the rotating speed of the rotary member of the mechanical power transmitting portion disposed on one side of the coupling device nearer to the engine, and the excessive rises of the rotating speeds of the bearing rotated with the rotary member and the electric motor connected to the rotary member, thereby making it possible to assure high durability of those rotary member, bearing and electric motor.

(3) A control apparatus for a vehicular drive system including an electric differential portion and a mechanical power transmitting portion which are disposed in series in a power transmitting path between an engine and a drive wheel of a vehicle, the control apparatus being configured to limit an output of the engine according to a ratio of an actual rotating speed of the mechanical power transmitting portion to a theoretical rotating speed estimated from a presently established speed ratio of the mechanical power transmitting portion.

The control apparatus constructed according to the above-described mode (3) of the invention, which is configured to limit the output of the engine according to the ratio of the actual rotating speed of the mechanical power transmitting portion to the above-indicated theoretical rotating speed, is effective to reduce or prevent an excessive rise of the rotating speed of a rotary member of the mechanical power transmitting portion disposed on one side of a coupling device nearer to the engine, and excessive rises of the rotating speeds of a bearing rotated with the rotary member and an electric motor connected to the rotary member, even in the event of reduction of torque capacity of the coupling device due to some abnormality of the coupling device, thereby making it possible to assure high durability of those rotary member, bearing and electric motor.

(4) The control apparatus according to the above-described mode (3), comprising engine-output limiting means configured to limit the output of the engine such that an upper limit value of the output is smaller when the above-indicated ratio is higher than a predetermined threshold, than when the ratio is not larger than the predetermined threshold value.

According to the above-described mode (4) wherein the control apparatus comprises the engine-output limiting means, this engine-output limiting means effectively reduces or prevents the excessive rise of the rotating speed of the rotary member of the mechanical power transmitting portion disposed on one side of the coupling device nearer to the engine, and the excessive rises of the rotating speeds of the bearing rotated with the rotary member and the electric motor connected to the rotary member, thereby making it possible to assure high durability of those rotary member, bearing and electric motor.

(5) A control apparatus for a vehicular drive system including an electric differential portion and a mechanical power transmitting portion which are disposed in series in a power transmitting path between an engine and a drive wheel of a vehicle, the control apparatus being configured to limit an output of the engine according to a difference of an actual speed ratio of the mechanical power transmitting portion from a theoretical speed ratio of the mechanical power transmitting portion.

The control apparatus constructed according to the above-described mode (5) of the invention, which is configured to limit the output of the engine according to the difference between the actual and theoretical speed ratios of the mechanical power transmitting portion, is effective to reduce or prevent an excessive rise of the rotating speed of a rotary member of the mechanical power transmitting portion disposed on one side of a coupling device nearer to the engine, and excessive rises of the rotating speeds of a bearing rotated with the rotary member and an electric motor connected to the rotary member, even in the event of reduction of torque capacity of the coupling device due to some abnormality of the coupling device, thereby making it possible to assure high durability of those rotary member, bearing and electric motor.

(6) The control apparatus according to the above-described mode (5), comprising engine-output limiting means configured to limit the output of the engine such that an upper limit value of the output is smaller when the difference is larger than a predetermined threshold, than when the difference is not larger than said predetermined threshold value.

According to the above-described mode (6) wherein the control apparatus comprises the engine-output limiting means, this engine-output limiting means effectively reduces or prevents the excessive rise of the rotating speed of the rotary member of the mechanical power transmitting portion disposed on one side of the coupling device nearer to the engine, and the excessive rises of the rotating speeds of the bearing rotated with the rotary member and the electric motor connected to the rotary member, thereby making it possible to assure high durability of those rotary member, bearing and electric motor.

(7) The control apparatus according to any one of the above-described modes (1)-(6), wherein the electric differential portion includes an electric motor and is operable as an electrically controlled continuously-variable transmission while an operating state of the electric motor is controlled.

According to the above-described mode (7), the speed ratio of the electric differential portion is continuously variable, so that the speed ratio of the vehicular drive system as a whole is continuously variable.

(8) The control apparatus according to any one of the above-described modes (1)-(7), wherein the electric differential portion includes a differential mechanism operable to distribute the output of the engine to a first electric motor and an input shaft of the mechanical power transmitting portion, and a second electric motor connected to the input shaft, the control apparatus comprises first-electric-motor-speed control means configured to control a rotating speed of the first electric motor such that a rotating speed of the second electric motor does not exceed a predetermined upper limit.

According to the above-described mode (8), the control apparatus comprising the first-electric-motor-speed control means more effectively reduces or prevents the excessive rise of the rotating speed of the rotary member of the mechanical power transmitting portion disposed on one side of the coupling device nearer to the engine, and the excessive rises of the rotating speeds of the bearing rotated with the rotary member and the electric motor connected to the rotary member, thereby making it possible to assure high durability of those rotary member, bearing and electric motor.

(9) The control apparatus according to any one of the above-described modes (1)-(8), the mechanical power transmitting portion is a step-variable or continuously-variable transmission device including a coupling device which selectively permits and inhibits power transmission through the transmission device.

According to the above-described mode (9), the engine-output limiting means effectively reduces or prevents the excessive rise of the rotating speed of the rotary member of the step-variable or continuously-variable transmission device disposed on one side of the coupling device nearer to the engine, and the excessive rises of the rotating speeds of the bearing rotated with the rotary member and the electric motor connected to the rotary member, even in the event of reduction of the torque capacity of the coupling device due to some abnormality of the coupling device of the transmission device, thereby making it possible to assure high durability of those rotary member, bearing and electric motor.

(10) The control apparatus according to above-described mode (1), (3) or (5), wherein said mechanical power transmitting portion is automatically shifted in accordance with a shifting lines using an output torque and a vehicle speed as parameters.

(11) The control apparatus according to above-described mode (2), (4) or (6), wherein a normal upper limit value of said upper limit value is set not less than a maximum value of the engine output torque.

(12) The control apparatus according to above-described mode (2) (4) or (6), wherein a reduced upper limit value is set in advance, as an upper limit below which an excessive rotation of the second electric motor is prevented even upon occurrence of an excessive slipping action in the mechanical power transmitting portion of a clutch due to abnormity.

(13) The control apparatus according to above-described mode (8), wherein a predetermined threshold value for a rotating speed difference is set, as an upper limit above which the control to limit the output torque of said engine is initiated to prevent an excessive rotation of the second electric motor.

The mechanical power transmitting portion may be a power transmitting device including frictional coupling devices, or a friction type power transmitting device the speed ratio of which is fixed. Preferably, however, the mechanical power transmitting portion is an automatic transmission selected from among: a step-variable automatic transmission including at least one planetary gear set each having a plurality of rotary elements, and a plurality of frictional coupling devices operable to connect the rotary elements to each other or a stationary member; a belt-and-pulley type continuously variable transmission including a pair of variable-diameter pulleys and a belt connecting the pulleys for frictionally transmitting a vehicle drive force; and a toroidal type continuously variable transmission including a pair of cones and a plurality of rollers which have respective axes and which are held between the two cones to frictionally transmit a vehicle drive force. The above-indicated pair of variable-diameter pulleys and transmission belt, and the above-indicated pair of cones and the rollers are considered to a kind of frictional coupling devices.

Preferably, the output of the engine can be limited by controlling a fuel injecting valve to effect a fuel cut for cutting a supply of a fuel to the engine, or controlling a throttle valve to reduce an amount of supply of an air-fuel mixture to the engine.

Preferably, the control apparatus further comprises drive-position-selection determining means configured to determine whether a shift lever of the vehicle is placed in any one of vehicle drive positions, and one of: rotating-speed-difference determining means configured to determine whether the above-indicated difference between the actual rotating speed of the mechanical power transmitting portion and the theoretical rotating speed is larger than the predetermined threshold value; rotating-speed-ratio determining means configured to determine whether the above-indicated ratio of the actual rotating speed of the mechanical power transmitting portion to the theoretical rotating speed is higher than the predetermined threshold value; and speed-ratio-difference determining means configured to determine whether the above-indicated difference of the actual speed ratio of the mechanical power transmitting portion from the theoretical speed ratio is larger than the predetermined threshold value. In this case, the above-described engine-output limiting means limits the output of the engine when one of the above-described three determining means has obtained an affirmative determination while the drive-position-selection determining means obtains an affirmative determination. Where the control apparatus comprises the first-electric-motor-speed control means, this first-electric-motor-speed control means controls the rotating speed of the first electric motor when one of the above-described three determining means has obtained the affirmative determination while the drive-position-selection determining means obtains the affirmative determination.

BRIEF DESCRIPTION OF THE DRAWINGS

The above and other objects, features, advantages, and technical and industrial significance of this invention will be better understood by reading the following detailed description of the preferred embodiments of the present invention, when considered in connection with the accompanying drawings, in which:

FIG. 1 is a schematic view showing an arrangement of a vehicular drive system in the form of a transmission mechanism of a hybrid vehicle to which the present invention is applicable;

DETAILED DESCRIPTION OF THE PREFERRED EMBODIMENTS

First Embodiment

Figure 2:
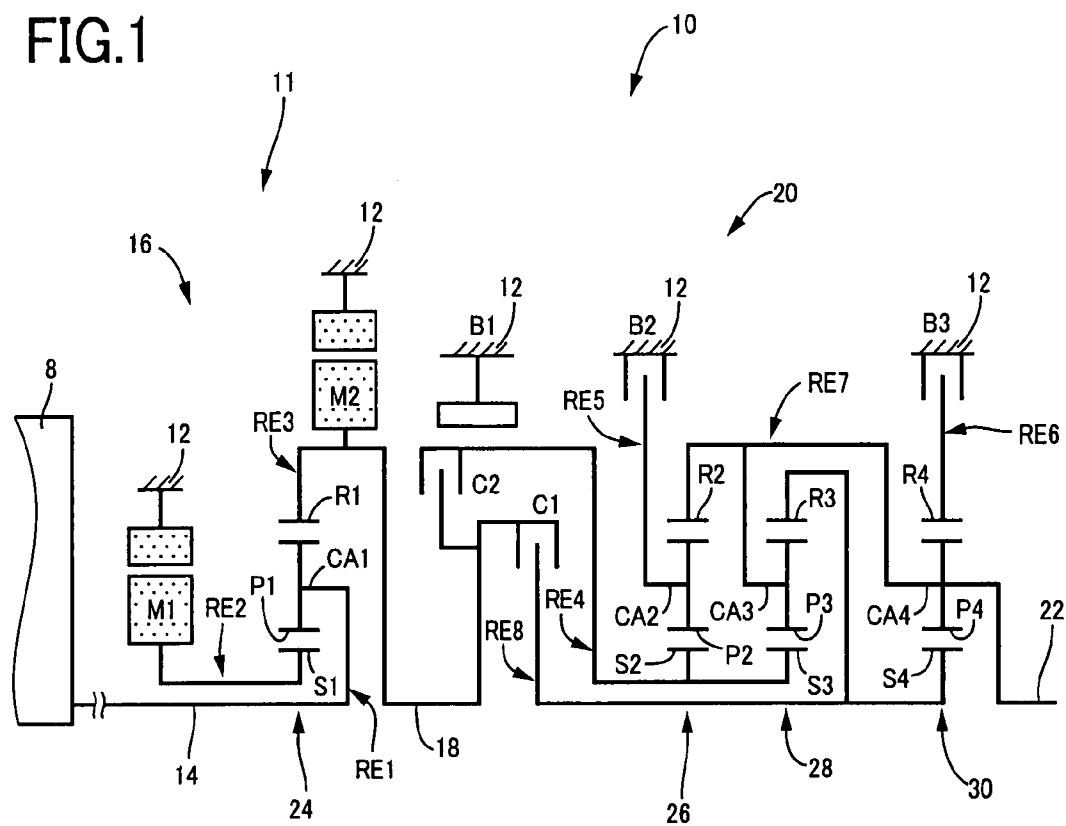
FIG. 2 is a table indicating shifting actions of a step-variable automatic transmission portion provided in the transmission mechanism of FIG. 1, in relation to different combinations of operating states of hydraulically operated frictional coupling devices to effect the respective shifting actions.

Referring to the schematic view of FIG. 1, there is shown a transmission mechanism 10 constituting a part of a drive system for a hybrid vehicle, which drive system is controlled by a control apparatus constructed according to this invention.

As shown in FIG. 1, the transmission mechanism 10 includes: an input rotary member in the form of an input shaft 14; a continuously-variable transmission portion in the form of an electric differential portion 11 connected to the input shaft 14 either directly, or indirectly via a pulsation absorbing damper (vibration damping device) not shown; a mechanical power transmitting portion in the form of an automatic transmission portion 20 disposed between the electric differential portion 11 and drive wheels 34 (shown in FIG. 7) of the vehicle, and connected in series via a power transmitting member 18 (power transmitting shaft) to the differential 11 and the drive wheels 34; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other.

Figure 7:
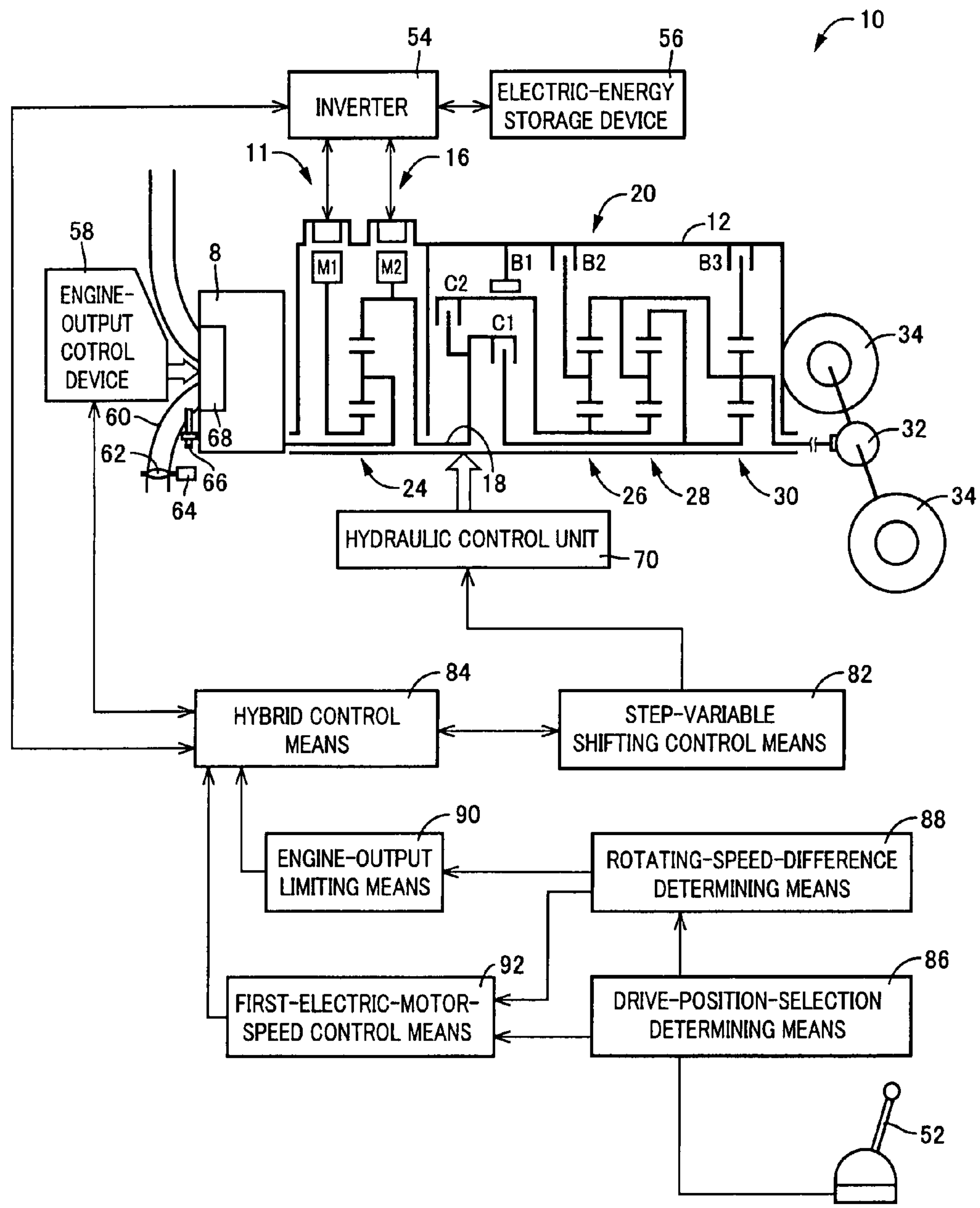
FIG. 7 is a functional block diagram illustrating major control functions of the electronic control device of FIG. 4.

This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and an input shaft of the automatic transmission portion 20 in the form of the power transmitting member 18; and a second electric motor M2 which is operatively connected to and rotated with the output shaft 22. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as a major component, a first planetary gear set 24 of a single pinion type having a gear ratio ρ1 of about 0.418, for example. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 is operated in a differential state in which three elements of the first planetary gear set 24 consisting of the first sun gear S1, first carrier CA1 and first ring gear R1 are rotatable relative to each other, so as to perform a differential function.

In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Thus, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed of the input shaft 14/rotating speed of the power transmitting member 18) of the power distributing mechanism 16 is continuously changed from a minimum value γ0min to a maximum value γ0max, that is, in the continuously-variable shifting state in which the differential portion 11 functions as an electrically controlled continuously-variable transmission the speed ratio γ0 of which is continuously variable from the minimum value γ0min to the maximum value γ0max.

The automatic transmission portion 20 includes a single-pinion type second planetary gear set 26, a single-pinion type third planetary gear set 28 and a single-pinion type fourth planetary gear set 30. The automatic transmission portion 20 is a multiple-step transmission operable as a step-variable automatic transmission, a mechanical transmission portion or a mechanical power transmitting portion. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2.

For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to shift the automatic transmission portion 20. Accordingly, the output of the engine 8 is transited to the automatic transmission portion 20 through the differential portion 11, and the first clutch C1 and/or second clutch C2. The first clutch C1 and the second clutch C2 function as input clutches of the automatic transmission portion 20.

When at least one of the first and second clutches C1 and C2 is placed in the engaged state, the power transmitting path between the power transmitting member 18 and the automatic transmission portion 20 is placed in a power transmitting state in which a vehicle drive force can be transmitted through the power transmitting path. When both of the first and second clutches C1, C2 are placed in the released state, the power transmitting path is placed in a power cut-off state in which the vehicle drive force cannot be transmitted through the power transmitting path. Thus, the first and second clutches C1, C2 function as coupling devices operable to place the power transmitting path between the power transmitting member 18 and the automatic transmission portion 20, that is, between the differential portion 11 (power transmitting member 18) and the drive wheels 34, selectively in one of the power transmitting state in which the vehicle drive force can be transmitted through the power transmitting path, and the power cut-off state in which the vehicle drive force cannot be transmitted through the power transmitting path.

The automatic transmission portion 20 is a step-variable transmission operable to perform a so-called "clutch-to-clutch" shifting action to establish a selected one of gear positions by an engaging action of one of the coupling devices and a releasing action of another coupling device. The above-indicated positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2.

Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 functioning as the step-variable transmission cooperate to constitute a continuously-variable transmission the speed ratio of which is continuously variable. While the differential portion 11 is controlled to hole its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting member speed $N_{18}$") is continuously changed, so that the speed ratio of the drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
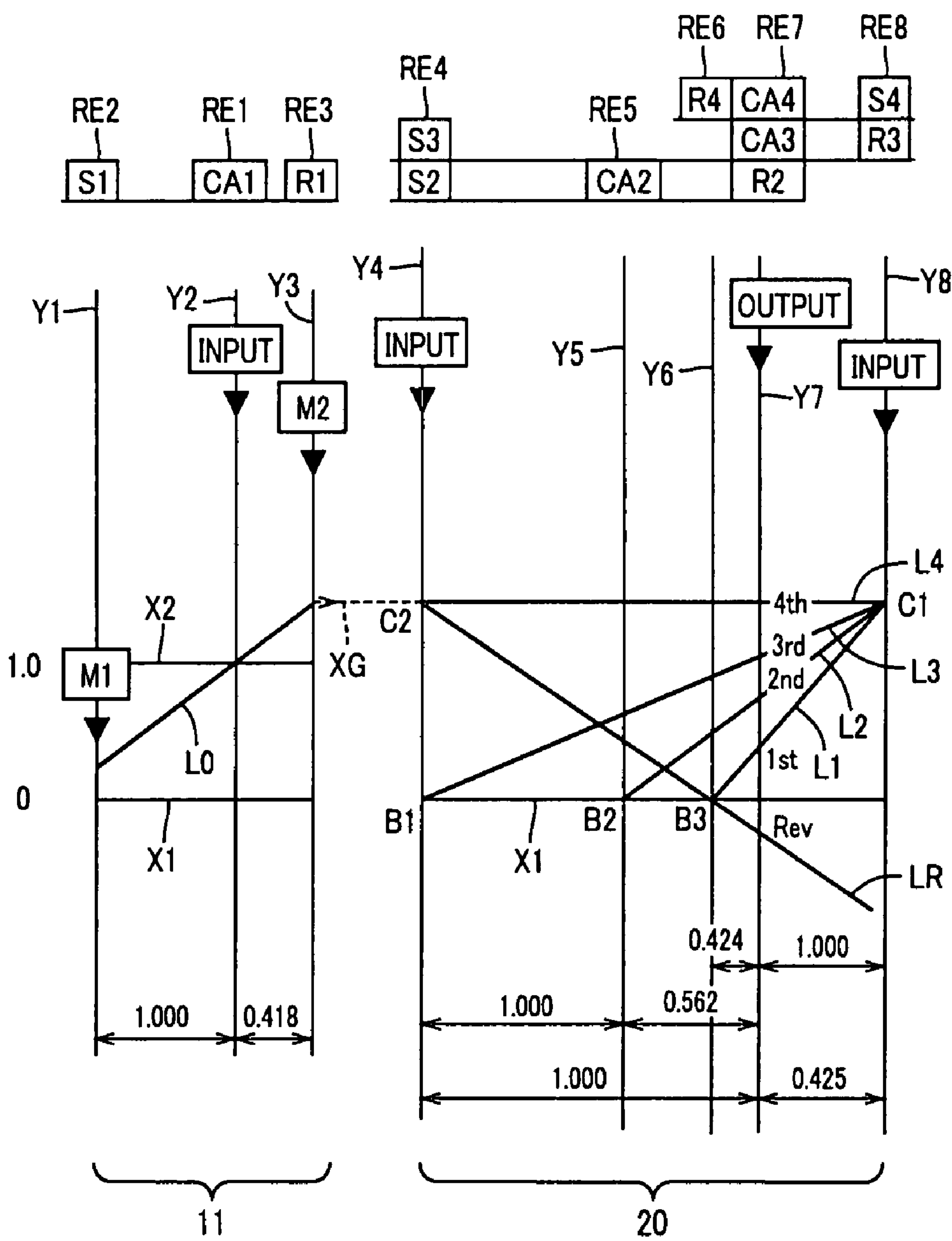
FIG. 3 is a collinear chart indicating relative rotating speeds of rotary elements of a differential portion and the step-variable automatic transmission portion of the transmission mechanism of FIG. 1, in a continuously-variable shifting state of the differential portion and a step-variable shifting state of the step-variable automatic transmission portion.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1.

Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30.

In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed NE is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3.

Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
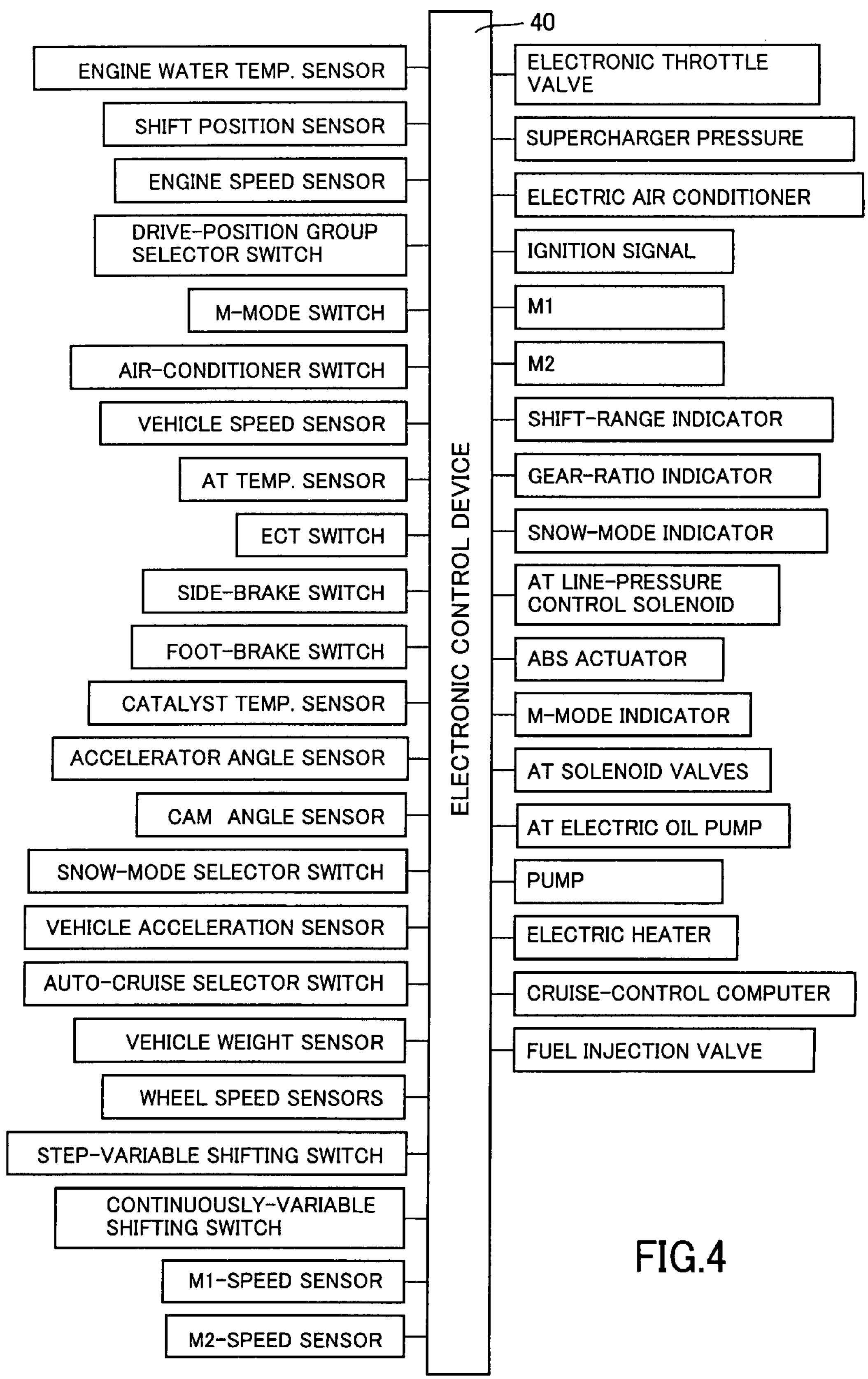
FIG. 4 is a view indicating input and output signals of an electronic control device according to one embodiment of this invention to control the transmission mechanism of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive various sensors and switches shown in FIG. 4, various signals such as: a signal indicative of a temperature $TEMP_W$ of cooling water of the engine 8; a signal indicative of a selected one of operating positions $P_{SH}$ of a shift lever 52 (shown in FIG. 7); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output shaft 22 (hereinafter referred to as "output shaft speed"); a signal indicative of a temperature TOIL of a working oil of the automatic transmission portion 20; a signal indicative of an operated state of a side brake; a signal indicative of an operated state of a foot brake; a signal indicative of a temperature of a catalyst; a signal indicative of a required amount of an output of the vehicle in the form of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of a rotating speed $N_{M1}$ of the first electric motor M1 (hereinafter referred to as "first electric motor speed $N_{M1}$); a signal indicative of a rotating speed $N_{M2}$ of the second electric motor M2 (hereinafter referred to as "second electric motor speed $N_{M2}$); and a signal indicative of an amount of electric energy SOS stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in a suction pipe 60 of the engine 8, a signal to control an amount of injection of a fuel by a fuel injecting device 66 into the suction pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves SL1-SL5 (shown in FIG. 5) incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to drive an electric heater; and a signal to be applied to a cruise-control computer.

Figure 5:
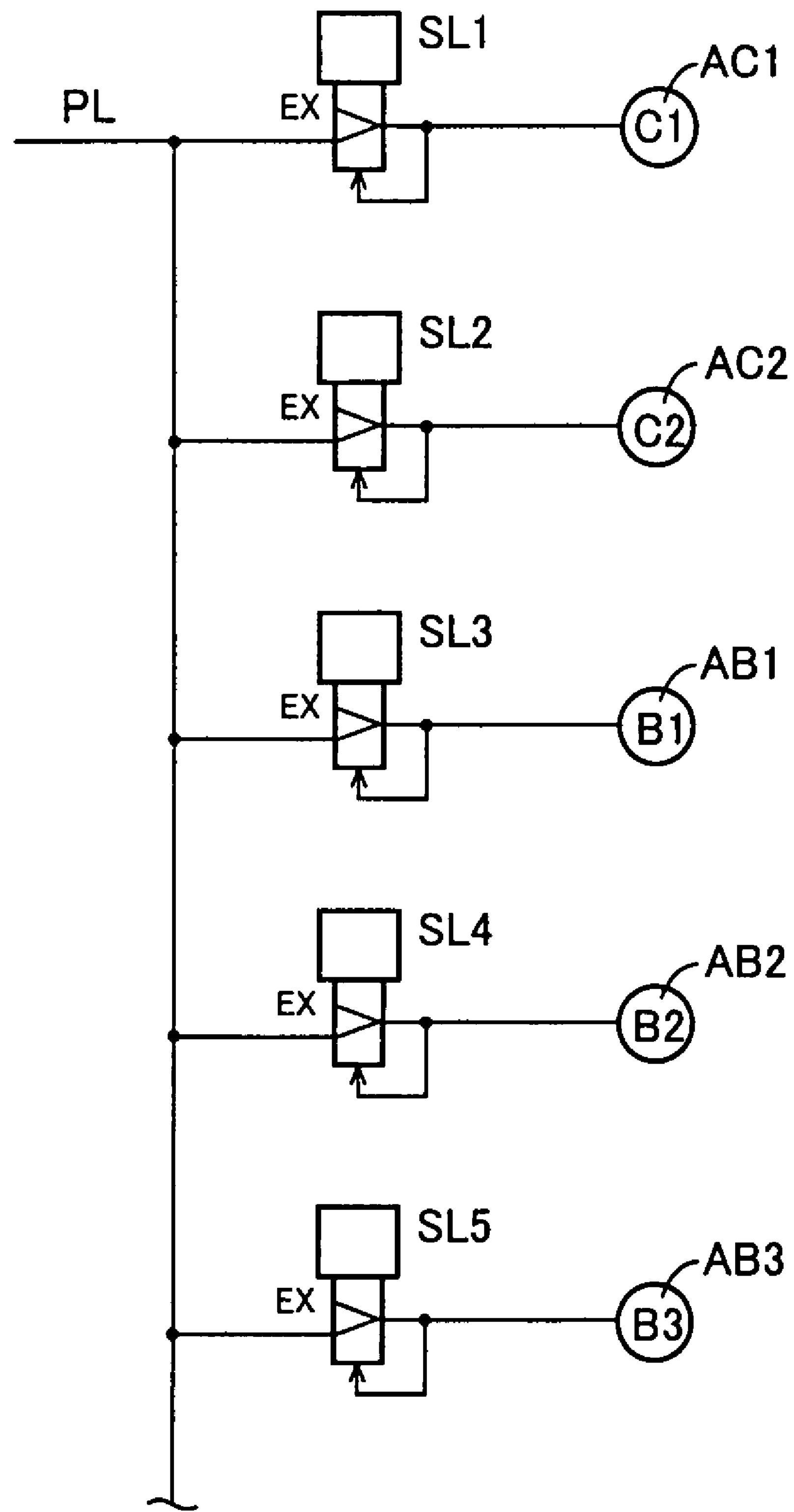
FIG. 5 is a view showing a major portion of a hydraulic control unit arranged to effect step-variable shifting actions of the step-variable automatic transmission portion of the transmission mechanism of FIG. 1.
Figure 6:
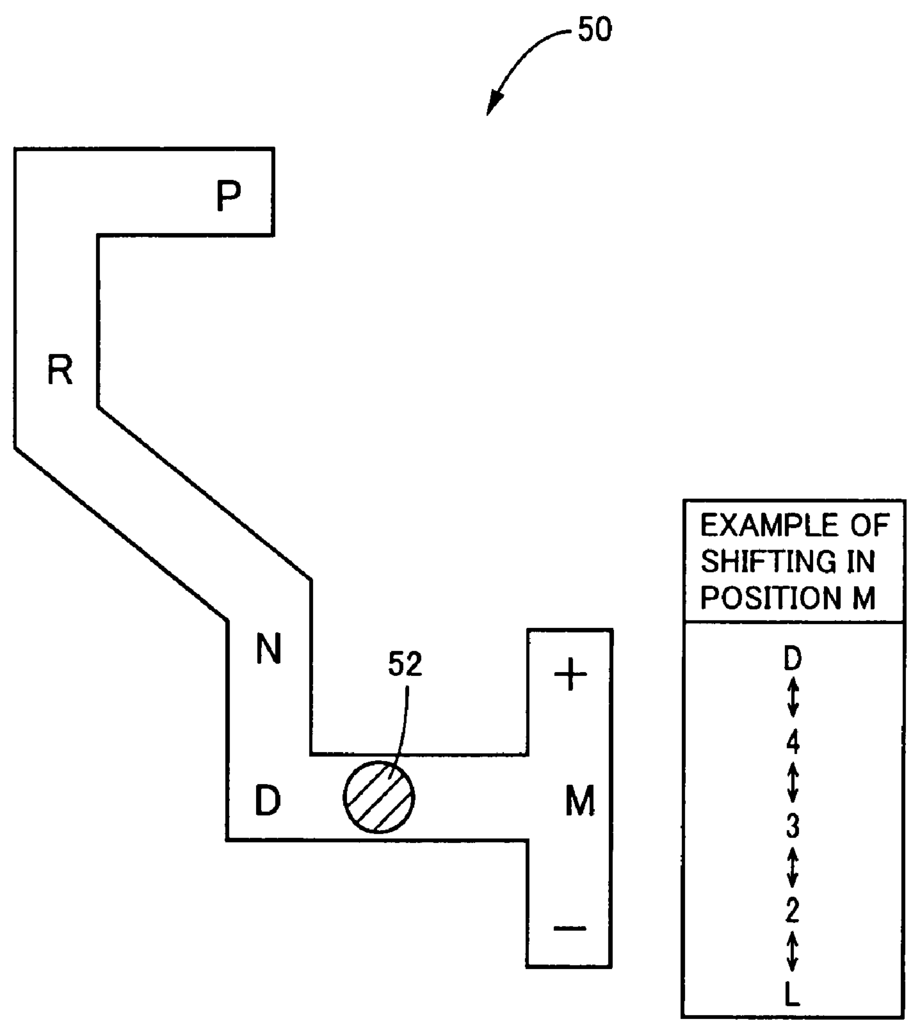
FIG. 6 is a view showing an example of a manually operated shifting device including a shift lever and operable to select one of a plurality of shift positions.

FIG. 5 shows a hydraulic circuit of the hydraulic control unit 70 arranged to control the linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by an electrically operated hydraulic oil pump (not shown) or a mechanical oil pump driven by the engine 30, and which is regulated by a relief-type pressure regulator valve according to a load of the engine 8 represented by the operation amount $A_{CC}$ of the accelerator pedal or the opening angle of the electronic throttle valve 62, for example.

The linear solenoid valves SL1-SL6 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 10:
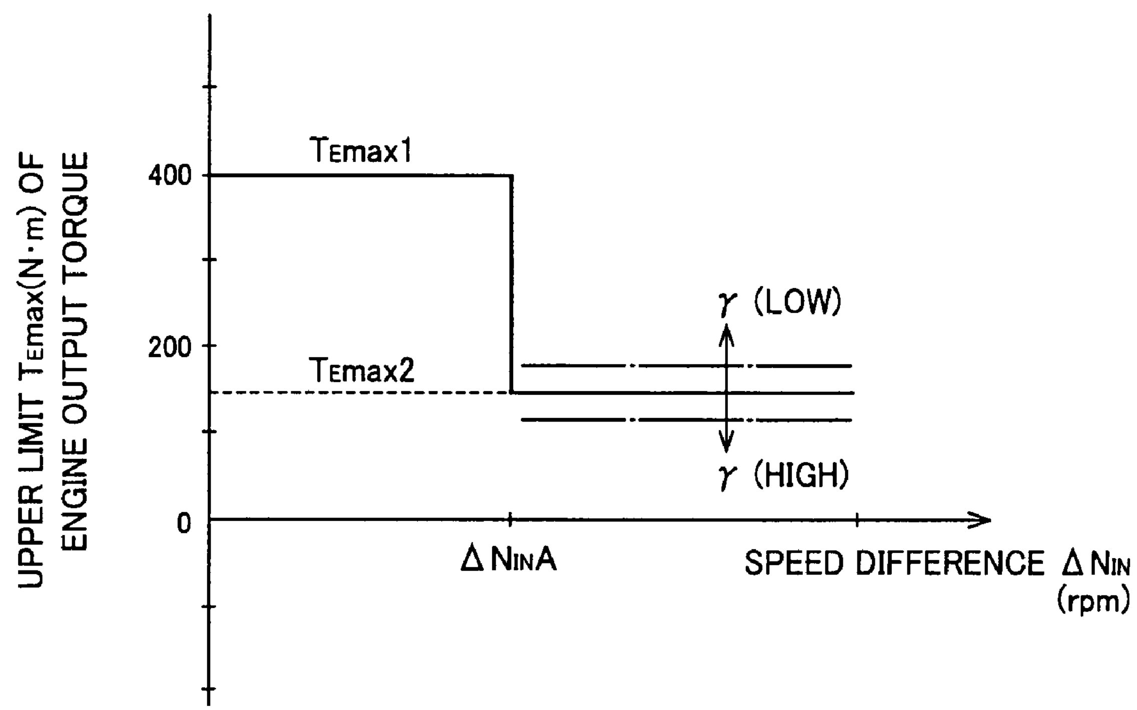
FIG. 10 is a view indicating a relationship between an upper limit of an engine output torque used by engine output limiting means shown in FIG. 7, and a rotating-speed difference.

FIG. 10 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of a parking position P for placing the drive system 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the drive system 10 in the neutral state; an automatic forward-drive shifting position D for establishing an automatic shifting mode; and a manual forward-drive shifting position M for establishing a manual shifting mode. In the automatic shifting mode, the overall speed ratio γT is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Referring to the functional block diagram of FIG. 7, the electronic control device 80 includes step-variable shifting control means 82, hybrid control means 84, drive-position-selection determining means 86, rotating-speed-difference determining means 88, and engine-output limiting means 90. The step-variable shifting control means 82 is configured to determine whether a shifting action of the automatic transmission portion 20 should take place, that is, to determine the gear position to which the automatic transmission portion 20 should be shifted. This determination is made on the basis of a condition of the vehicle represented by the vehicle speed V and a required output torque $T_{OUT}$ of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8. The required output torque TOUT is calculated on the basis of the actual operating amount $A_{CC}$ (%) of the accelerator pedal and the vehicle speed V, and according to a well know stored relationship among those parameters $T_{OUT}$, ACC and V.

The step-variable shifting control means 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control means 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control means 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control means 84 calculates a target (required) vehicle output at the present running speed V of the vehicle, on the basis of the operation amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1.

The hybrid control means 84 calculates a target output of the engine 8 to obtain the calculated target total vehicle output, while taking account of a power transmission loss, a load acting on various devices of the vehicle, an assisting torque generated by the second electric motor M2, etc. The hybrid control means 84 controls the speed $N_E$ and torque $T_E$ of the engine 8, so as to obtain the calculated target engine output, and the amount of generation of the electric energy by the first electric motor M1.

The hybrid control means 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20.

Figure 9:
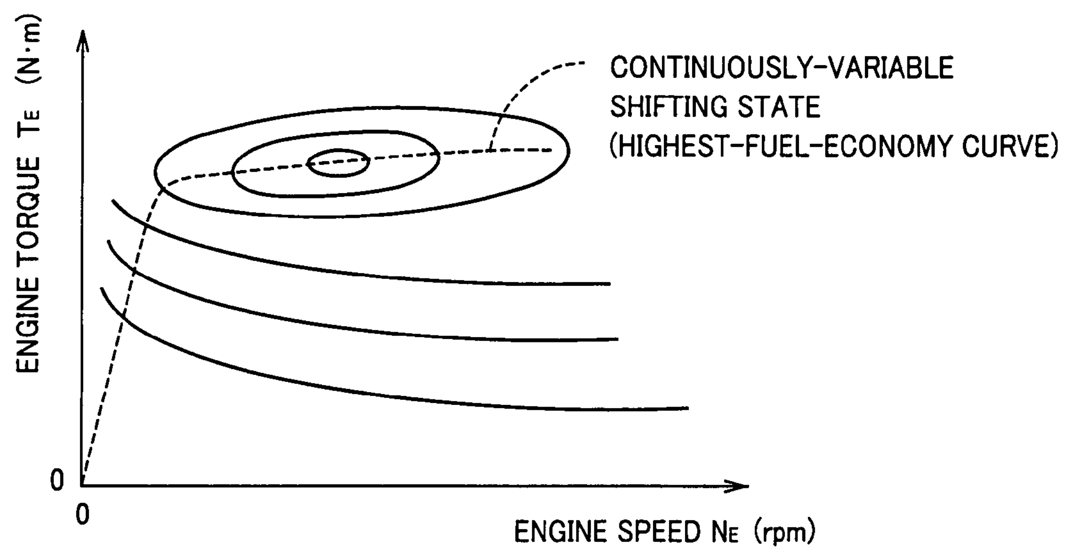
FIG. 9 is a view illustrating an example of a fuel consumption map defining a highest-fuel-economy curve of an engine controlled by hybrid control means shown in FIG. 7.

That is, the hybrid control means 82 determines a target value of the overall speed ratio γT of the transmission mechanism 10, so that the engine 8 is operated according to a stored highest-fuel-economy curve (fuel-economy map or relation) indicated by broken line in FIG. 9. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 82 controls the speed ratio γ0 of the differential portion 11, so as to obtain the target value of the overall speed ratio γT, so that the overall speed ratio γT can be controlled within a predetermined range.

In the hybrid control, the hybrid control means 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the -first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control means 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control means 84 is capable of controlling the first electric motor speed $N_{M1}$ and/or the second electric motor speed $N_{M2}$ as desired while holding the engine speed $N_E$ substantially constant or at a desired value.

To raise the engine speed $N_E$ during running of the vehicle, for example, the hybrid control means 84 raises the operating speed $N_{M1}$ of the first electric motor M1 since the transmitting-member speed $N_{18}$ is determined by the vehicle speed V (speed of the drive wheels 38), as is apparent from the collinear chart of FIG. 3. To hold the engine speed $N_E$ substantially constant during a shifting operation of the automatic transmission portion 20, the hybrid control means 84 changes the first electric motor speed $N_{M1}$ in a direction opposite to the direction of change of the transmitting-member speed $N_{18}$ caused by the shifting operation of the automatic transmission portion 20, while the engine speed $N_E$ is held substantially constant.

The hybrid control means 84 includes engine output control means functioning to command an engine-output control means 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control means 84 is basically arranged to control the throttle actuator 97 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control means 84.

Figure 8:
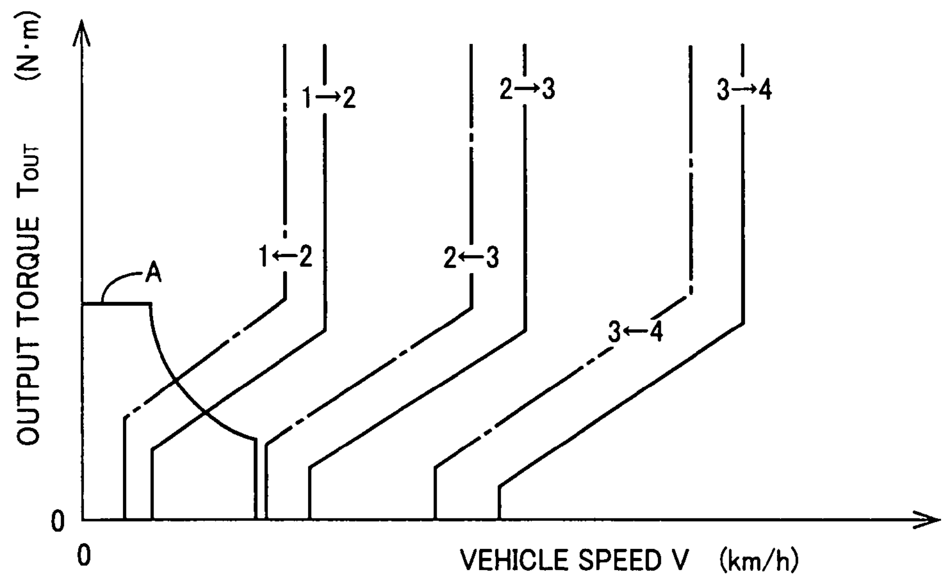
FIG. 8 is a view illustrating an example of a stored shifting boundary line map used for determining a shifting action of the step-variable automatic transmission portion, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 84 is capable of establishing a motor-drive mode to drive the vehicle by the electric motor, by utilizing the electrically controlled continuously shifting function (differential function) of the differential portion 11, irrespective of whether the engine 8 is in the non-operated state or in the idling state. Solid line A in FIG. 8 represents an example of a boundary line defining an engine-drive region and a motor-drive region, for switching the vehicle drive power source for starting and driving the vehicle (hereinafter referred to as "drive power source"), between the engine 8 and the second electric motor M2. In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source.

A predetermined stored relationship representing the boundary line (solid line A) of FIG. 8 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in memory, together with the shifting boundary line map (shifting map) indicated by solid lines and one-dot chain lines in FIG. 8.

The hybrid control means 84 establishes the motor-drive mode using the electric CVT function (differential function) of the differential portion 11, irrespective of whether the engine 8 is at rest or in an idling state, when the vehicle condition represented by the vehicle speed V and the required output torque $T_{OUT}$ is in the motor-drive region enclosed by solid line A in FIG. 8. Generally, the motor-drive mode is established by the hybrid control means 84, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. For reducing a dragging of the engine 8 in its non-operated state and improving the fuel economy in the motor-drive mode, the hybrid control means 84 is configured to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled to be in a non-load state, so as to be freely rotated to have a negative speed $N_{M1}$.

The hybrid control means 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control means 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control means 84 is arranged to place the first electric motor M1 in the non-load state, for thereby placing the differential portion 11 in a neutral state in which the power transmitting path is electrically cut off.

The drive-position-selection determining means 86 is configured to determine whether the shift lever 52 is placed in any one of the drive positions D, M and R. This determination is made on the basis of the signal indicative of the presently selected operating position $P_{SH}$ of the shift lever 52.

The rotating-speed-difference determining means 88 is operated when the shift lever 52 is placed in any drive position, and is configured to determine whether a rotating-speed difference $\Delta N_{IN}$ is larger than a predetermined threshold value $\Delta N_{IN}A$. The rotating-speed difference $\Delta N_{IN}$ is a difference between the actual rotating speed of the power transmitting member 18 (output member of the differential portion or electric continuously-variable transmission portion 11), which is calculated on the basis of an output signal of a resolver incorporated in the second electric motor M2, namely, the actual rotating speed $N_{IN}$1 of the input rotary member of the automatic transmission portion (mechanical power transmitting portion) 20, and a theoretical input-member speed $N_{IN}$2 (=$\gamma \times N_{OUT}$) which is calculated on the basis of the actual vehicle speed V (speed $N_{OUT}$ of the output shaft 22) and the speed ratio $\gamma$ of the presently established gear position of the automatic transmission portion 20. The input rotary member of the automatic transmission portion 20 is one of the first and second clutches C1, C2 and rotary members connected to the clutches C1, C2.

The engine-output limiting means 90 is operated when the rotating-speed-difference determining means 88 has determined that the rotating-speed difference $\Delta N_{IN}$ is larger than the predetermined threshold value $\Delta N_{IN}A$ (rpm), and is configured to limit the output torque $T_E$ of the engine 8 to an upper limit value $T_{Emax}$2 (N·m) which is smaller than an upper limit value $T_{Emax}$1 (N·m) used when the rotating-speed difference $\Delta N_{IN}$ is not larger than the predetermined threshold value $\Delta N_{IN}A$, as indicated in FIG. 10, so that the engine-output control device 58 commands the fuel injecting device 66 to effect a fuel cut of the engine 8, that is, to inhibit a fuel supply to the engine 8, or commands the throttle actuator 64 to reduce the opening angle of the throttle valve 62 for reducing the amount of supply of an air-fuel mixture to the engine 8. The upper limit $T_{Emax}$1 of the engine output torque $T_E$ used when the rotating-speed difference $\Delta N_{IN}$ is not larger than the predetermined threshold value $\Delta N_{IN}A$ is the maximum value of the engine output torque $T_E$, so that the engine output torque $T_E$ is not limited when the rotating-speed difference $\Delta N_{IN}$ is not larger than the predetermined threshold value $\Delta N_{IN}A$ The first-electric-motor-speed control means 92 is operated when the rotating-speed-difference determining means 88 has determined that that the rotating-speed difference $\Delta N_{IN}$ is larger than the predetermined threshold value $\Delta N_{IN}A$, and is configured to control the operating speed $N_{M1}$ of the first electric motor M1 such that the rotating speed $N_{M2}$ does not exceed a predetermined upper limit $N_{M2max}$. For example, the first-electric-motor-speed control means 92 increases the rotating speed $N_{M1}$ of the first electric motor M1 to prevent an excessive rise of the rotating speed $N_{M2}$ of the second electric motor M2. A control of the rotating speed $N_{M1}$ of the first electric motor M1 has a higher control response than a control of the output torque $T_E$ of the engine 8 by the above-indicated fuel cut.

Figure 11:
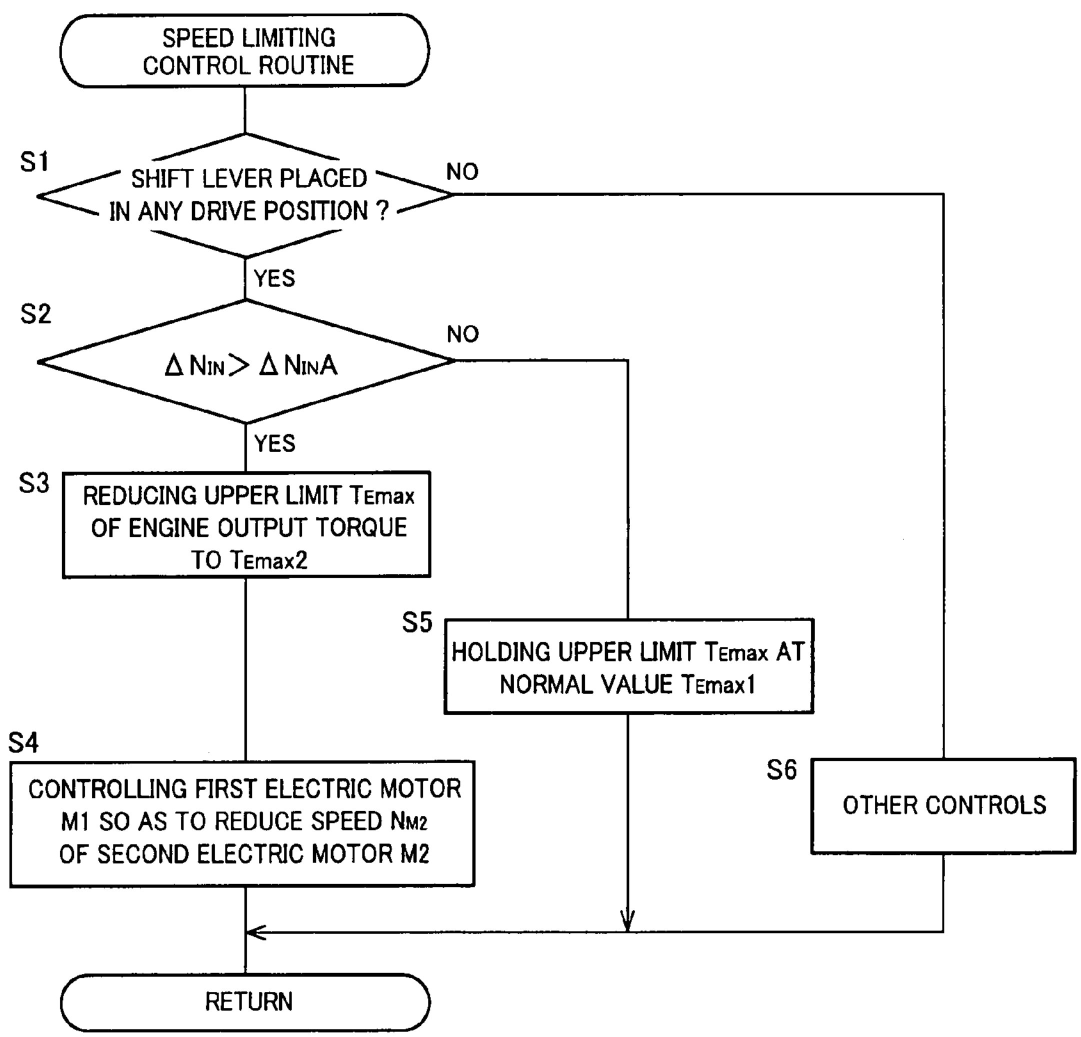
FIG. 11 is a flow chart illustrating a speed limiting control routine executed by the electronic control device shown in FIG. 4.

FIG. 11 is a flow chart illustrating a major portion of a control operation of the electronic control device 80, that is, a speed limiting control routine executed by the electronic control device 80 to prevent an excessive rise of the operating speed of the second electric motor M2 due to an abnormality of at least one of the input clutches in the form of the first and second clutches C1, C2. This speed limiting control routine is repeatedly executed with an extremely short cycle time of about several milliseconds to about several tens of milliseconds, for example.

The speed limiting control routine of FIG. 11 is initiated with step SI corresponding to the drive-position-selection determining means 86, to determine whether the shift lever 52 is placed in any one of the drive positions. If a negative determination is obtained in step Si, the control flow goes to step S6 to effect controls other than the control to limit the rotating speed of the second electric motor M2, and the present speed limiting control routine is terminated. If an affirmative determination is obtained in step S1, the control flow goes to step S2 corresponding to the rotating-speed-difference determining means 88, to determine whether the rotating-speed difference $\Delta N_{IN}$ is larger than the predetermined threshold value $\Delta N_{IN}A$, for example, 500 rpm.

As described above, the rotating-speed difference $\Delta N_{IN}$ is the difference between the actual rotating speed of the power transmitting member 18 (output member of the differential portion 11), which is calculated on the basis of the output signal of the resolver incorporated in the second electric motor M2, namely, the actual rotating speed $N_{IN}$1 of the input rotary member of the automatic transmission portion 20, and the theoretical input-member speed $N_{IN}$2 (=$\gamma \times N_{OUT}$) which is calculated on the basis of the actual vehicle speed V (speed $N_{OUT}$ of the output shaft 22) and the speed ratio $\gamma$ of the presently established gear position of the automatic transmission portion 20.

The predetermined threshold value $\Delta N_{IN}A$ is obtained by experimentation, as an upper limit above which the control to limit the output torque of the engine 8 is initiated to prevent an excessive rise of the rotating speed of the second electric motor M2. This predetermined threshold value $\Delta N_{IN}A$ corresponds to the slipping amount of the first clutch C1 and/or the second clutch C2 when the limitation of the output torque of the engine 8 is initiated.

If a negative determination is obtained in step S2, the control flow goes to step S5 in which the upper limit value $T_{Emax}$ of the engine torque $T_E$ is held at the normal value $T_{Emax1}$. Accordingly, the output torque $T_E$ of the engine 8 is controlled by the engine-output control device 58, to be held not larger than the normal upper limit value $T_{Emax1}$. This normal upper limit value $T_{Emax1}$ is equal to the maximum value of the engine output torque $T_E$, Therefore, the output torque TE of the engine 8 is not substantially limited while the rotating-speed difference $\Delta N_{IN}$ is not larger than the predetermined threshold value $\Delta N_{IN}A$.

If an affirmative determination is obtained in step S2, the control flow goes to step S3 corresponding to the engine-output limiting means 90, in which the upper limit value $T_{Emax}$ of the output torque $T_E$ of the engine 8 is reduced to the reduced value $T_{Emax2}$, which is smaller than the normal value $T_{Emax1}$, as indicated in FIG. 10. As a result, the output torque $T_E$ of the engine 8 is limited by the engine-output control device 58, to the reduced upper limit value $T_{Emax2}$. This reduced upper limit value $T_{Emax2}$ is obtained by experimentation, as an upper limit below which an excessive rise of the rotating speed of the second electric motor M2 can be prevented even in the event of an occurrence of an excessive slipping action of the first clutch C1 and/or the second clutch C2 due to an abnormality associated with the clutches C1, C2, such as a failure of a solenoid coil of the linear solenoid valve SL1 and/or the linear solenoid valve SL2, or sticking of a spool of the linear solenoid valve SL1, SL2.

Step S3 is followed by step S4 corresponding to the first-electric-motor-speed control means 92, to control the rotating speed $N_{M1}$ of the first electric motor M1 for preventing the rotating speed $N_{M2}$ of the second electric motor M2 from exceeding a predetermined upper limit $N_{M2max}$. For example, the first-electric-motor-speed control means 92 raises the rotating speed $N_{M1}$ of the first electric motor M1 to increase the torque of the sun gear S1, for thereby preventing a rise of the rotating speed $N_{M2}$ of the second electric motor M2 above the predetermined upper limit $N_{M2max}$, for example 10,000 rpm.

As described above, the electronic control device 80 according to the present embodiment of the invention is provided for controlling the vehicular transmission mechanism or drive system 10 including the electric continuously-variable transmission portion in the form of the differential portion 11 and the mechanical power transmitting portion in the form of the automatic transmission portion 20 which are disposed in series with each other in the power transmitting path between the engine 8 and the drive wheels 34. The electronic control device 80 is configured to limit the output torque of the engine 8 according to the difference $\Delta N_{IN}$ between the actual rotating speed $N_{IN}$1 of the input rotary member of the automatic transmission portion 20, and the theoretical input-member speed $N_{IN}$2 ($=\gamma \times N_{OUT}$) which is calculated on the basis of the actual vehicle speed V (speed $N_{OUT}$ of the output shaft 22) and the speed ratio $\gamma$ of the presently established gear position of the automatic transmission portion 20.

Accordingly, reduction of the torque capacity of the input clutch C1, C2 due to some abnormality of the input clutch C1, C2 during running of the vehicle does not cause an excessive rise of the rotating speed of a rotary member of the automatic transmission portion 20 disposed on one side of the input clutch C1, C2 nearer to the engine 8, and excessive rises of the rotating speeds of a bearing rotated with the rotary member and the second electric motor M2 connected to the rotary member, even in the event of reduction of torque capacity of the coupling device due to some abnormality of the coupling device, thereby making it possible to assure high durability of those rotary member, bearing and electric motor. This function of the electronic control device 80 of the present embodiment is particularly advantageous for the vehicular transmission mechanism or drive system 10 that has a reduced axial dimension and a plurality of gear positions which have respective speed ratios (close to each other and changing over a wide range) and which are established by a plurality of input clutches in the form of the first and second clutches C1, C2.

Further, the electronic control device 80 of the present embodiment comprises the engine-output limiting means 90, which is configured to limit the output torque of the engine 8 such that the upper limit $T_{Emax}$ of the output torque is smaller when the rotating-speed difference $\Delta N_{IN}$ is larger than the predetermined threshold value $\Delta N_{IN}A$, than when the rotating-speed difference $\Delta N_{IN}$ is not larger than the predetermined threshold value $\Delta N_{IN}A$. This engine-output limiting means 90 effectively reduces or prevents the excessive rise of the rotating speed of the rotary member of the automatic transmission portion 20 disposed on one side of the input clutch C1, C2 nearer to the engine 8, and the excessive rises of the rotating speeds of the bearing rotated with the rotary member and the second electric motor M2, thereby making it possible to assure high durability of those rotary member, bearing and electric motor.

Further, the electric continuously-variable transmission portion in the form of the differential portion 11 includes a differential mechanism in the form of the power distributing mechanism 16 operable to distribute the output of the engine 8 to the first electric motor M1 and an input shaft in the form of the power transmitting member 18 of the automatic transmission portion 20, and the second electric motor M2 connected to the input shaft. The electronic control device 80 of the present embodiment further comprises the first-electric-motor-speed control means 92 configured to control the rotating speed $N_{M1}$ of the first electric motor M1 such that the rotating speed $N_{M2}$ of the second electric motor M2 does not exceed the predetermined upper limit $N_{M2max}$. The electronic control device 80 comprising this first-electric-motor-speed control means 92 more effectively reduces or prevents the excessive rise of the rotating speed of the rotary member of the automatic transmission portion 20 disposed on one side of the input clutch C1, C2 nearer to the engine 8, and the excessive rises of the rotating speeds of the bearing rotated with the rotary member and the second electric motor M2, thereby making it possible to assure high durability of those rotary member, bearing and electric motor.

Other embodiments of this invention will be described. In the following description, the same reference signs as used in the first embodiment will be used to identify the same elements.

Second Embodiment

In the first embodiment, the upper limit value $T_{Emax2}$ of the engine output torque $T_E$ is held constant. However, the upper limit value $T_{Emax2}$ may change with the presently established speed ratio $\gamma$ of the automatic transmission portion 20 such that the upper limit value $T_{Emax2}$ decreases with an increase of the speed ratio $\gamma$. One-dot chain lines in FIG. 10 represent the upper limit values $T_{Emax2}$ corresponding to the different speed ratio values $\gamma$ of the automatic transmission portion 20. Alternatively, the upper limit value $T_{Emax2}$ may change with the rotating speed $N_{M2}$ of the second electric motor M2 such that the upper limit value $T_{Emax2}$ decreases with an increase of the rotating speed $N_{M2}$. Further alternatively, the upper limit value $T_{Emax2}$ may decrease with an increase of the speed ratio γ and an increase of the rotating speed $N_{M2}$.

Third Embodiment

Figure 12:
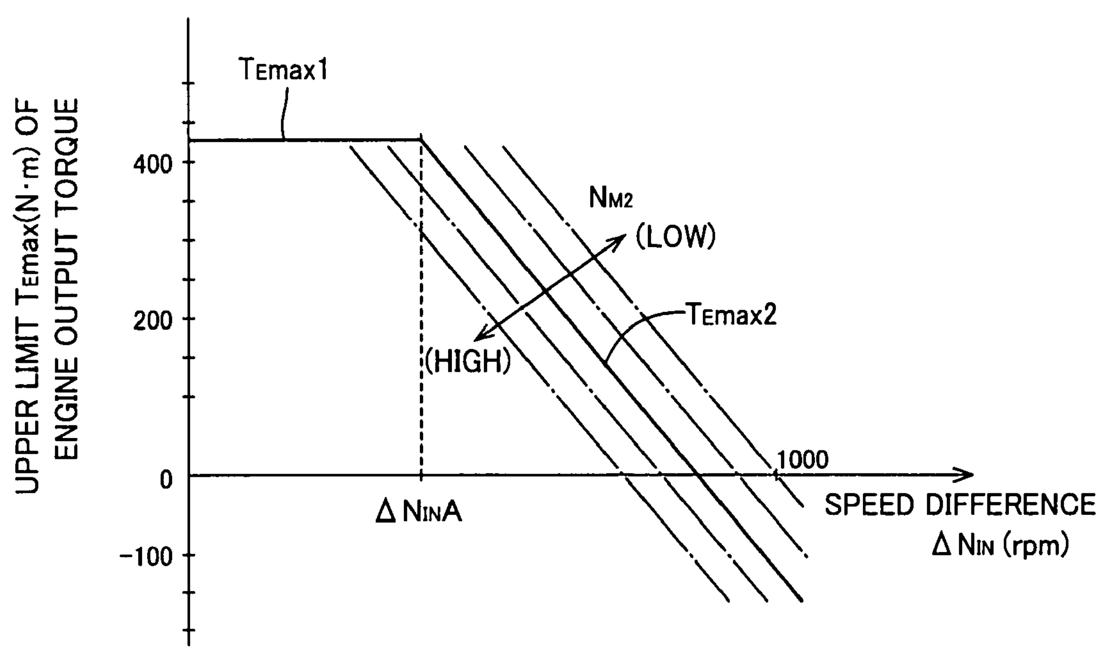
FIG. 12 is a view indicating a relationship between the upper limit of the engine output torque used by the engine output limiting means and the rotating-speed difference, in another embodiment of this invention.

In the first and second embodiments described above, the upper limit value $T_{Emax}$ of the output torque $T_E$ of the engine 8 is abruptly reduced from the normal value $T_{Emax}$1 to the reduced value $T_{Emax2}$, when the rotating-speed difference $\Delta_{NI}N$ becomes larger than the threshold value $\Delta N_{IN}A$, as indicated in FIG. 10. In the present third embodiment, however, the upper limit value $T_{Emax}$ continuously or gradually decreases with an increase of the rotating-speed difference $\Delta_{NI}N$, as indicated by one-dot chain lines in FIG. 12. Alternatively, the upper limit value $T_{Emax}$ may continuously or gradually decrease with an increase of the speed ratio γ of the automatic transmission portion 20. Further alternatively, the upper limit value $T_{Emax2}$ may decrease with an increase of the rotating speed $N_{M2}$ and an increase of the speed ratio γ. This embodiment permits a higher degree of stability to prevent the excessive rise of the rotating speed $N_{M2}$ of the second electric motor M2.

Fourth Embodiment

Figure 13:
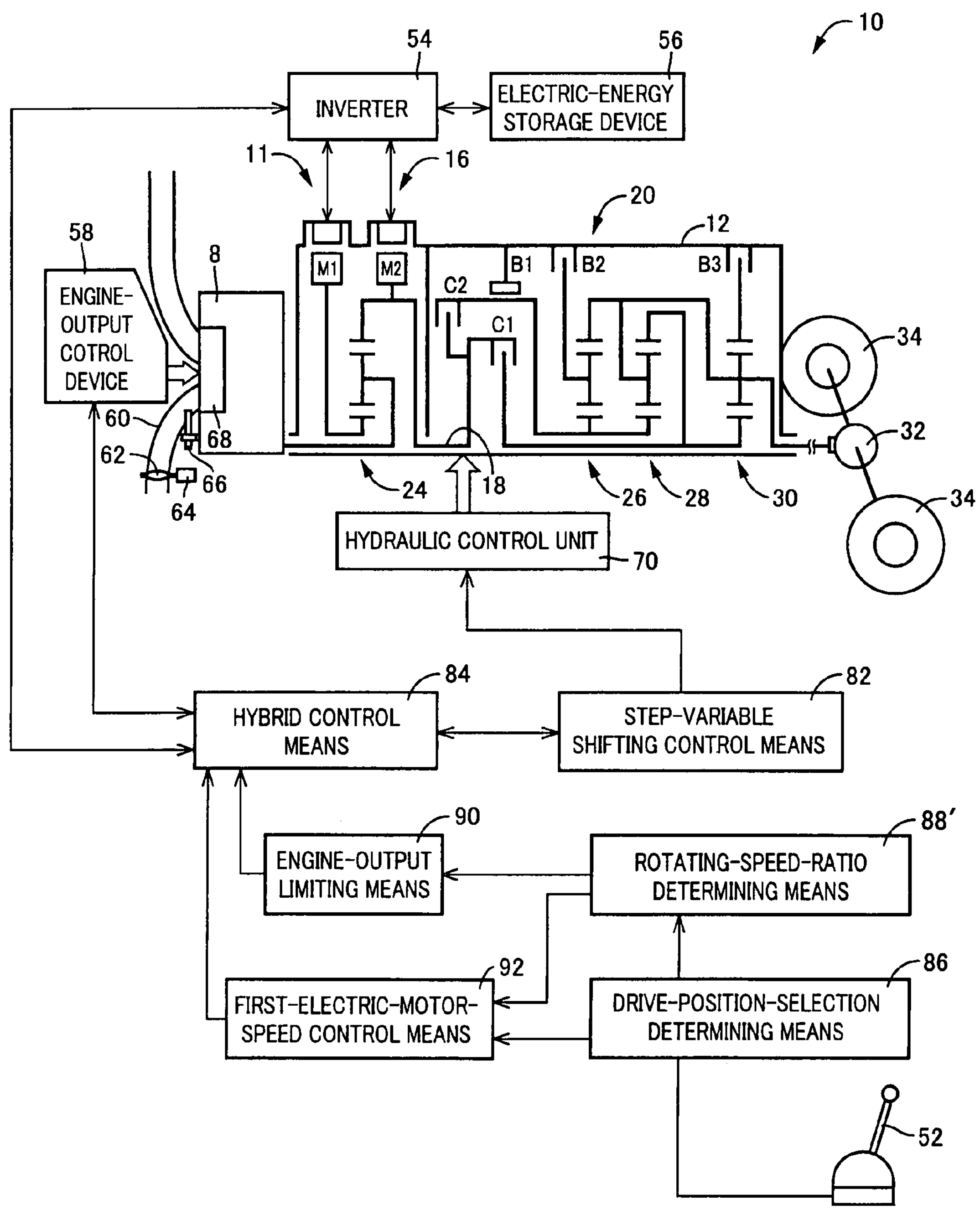
FIG. 13 is a functional block diagram corresponding to that of FIG. 7, illustrating major control functions of an electronic control device according to a further embodiment of this invention.
Figure 14:
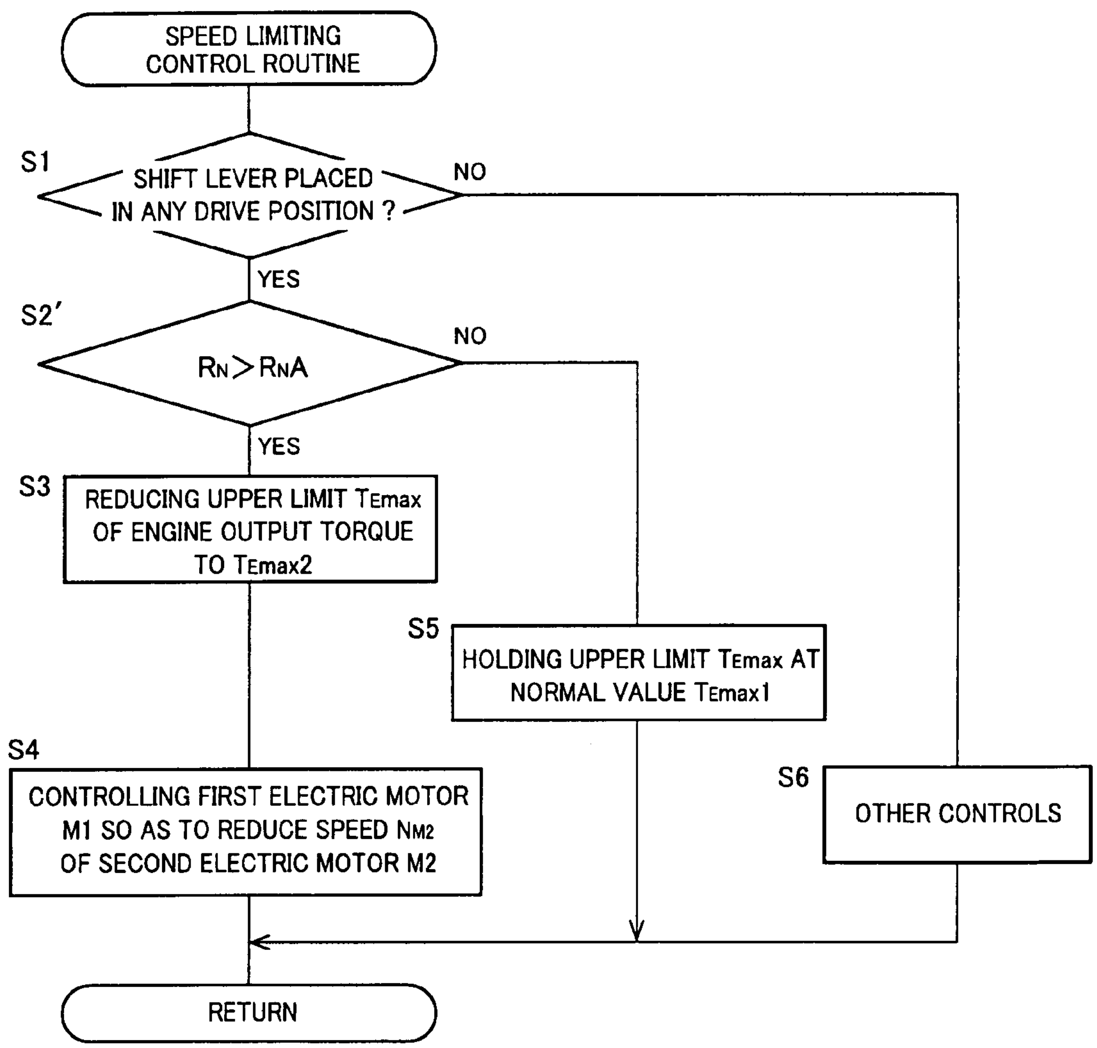
FIG. 14 is a flow chart illustrating a speed limiting control routine executed by the electronic control device shown in FIG. 13.

Referring to FIGS. 13 and 14, there will be described a fourth embodiment of this invention. FIG. 13 is a block diagram illustrating major control functions of the electronic control device 80 according to the fourth embodiment configured to prevent an excessive rise of the rotating speed of the second electric motor M2 due to abnormal reduction of the torque capacity of the input clutch C1 and/or the input clutch C2. FIG. 14 is a flow chart illustrating a speed limiting control routine executed by the electronic control device 80 shown in FIG. 13. The electronic control device 80 of FIG. 13 according to the fourth embodiment is identical with that of FIG. 7 according to the first, second and third embodiments, except that rotating-speed-radio determining means 88' is provided in place of the rotating-speed-difference determining means 88. The speed limiting control routine of FIG. 14 is identical with that of FIG. 11, except that step S2' corresponding to the rotating-speed-ratio determining means 88' is provided in place of step S2 corresponding to the rotating-speed-difference determining means 88. Therefore, only the rotating-speed-ratio determining means 88' and the step S2' will be described.

The rotating-speed-ratio determining means 88' is operated when the shift lever 52 is placed in any drive position, and is configured to determine whether a rotating-speed ratio $R_N$ is higher than a predetermined threshold value $R_NA$. The rotating-speed ratio $R_N$ is a ratio $N_{IN}$1/$N_{IN}$2 of the actual rotating speed of the power transmitting member 18 (output member of the differential portion or electric continuously-variable transmission portion 11), which is calculated on the basis of then output signal of the resolver incorporated in the second electric motor M2, namely, the actual rotating speed $N_{IN}$1 of the input rotary member of the automatic transmission portion (mechanical power transmitting portion) 20, with respect to a theoretical input-member speed $N_{IN}$2 (=γ×$N_{OUT}$) which is calculated on the basis of the actual vehicle speed V (speed $N_{OUT}$ of the output shaft 22) and the speed ratio γ of the presently established gear position of the automatic transmission portion 20. Like the threshold value $\Delta N_{IN}A$ of the rotating-speed difference $\Delta N_{IN}$, the threshold value $R_NA$ of the rotating-speed ratio $R_N$ is determined as an upper limit above which the control to limit the output torque of the engine 8 is initiated to prevent an excessive rise of the rotating speed of the second electric motor M2. For instance, threshold value $R_NA$ is determined to be about 1.3.

When the rotating-speed-ratio determining means 88' has determined that the rotating-speed ratio $R_N$ (=$N_{IN}$1/$N_{IN}$2) is higher than the predetermined threshold value $R_NA$, the engine-output limiting means 90 limits the output torque $T_E$ of the engine 8 to the reduced upper limit value $T_{Emax2}$ (N·m) which is smaller than the normal upper limit value $T_{Emax}$1 (N·m) used when the rotating-speed ratio $R_N$ is not higher than the predetermined threshold value $R_NA$, as in the case of FIG. 10, so that the engine-output control device 58 commands the fuel injecting device 66 to effect the fuel cut of the engine 8, that is, to inhibit the fuel supply to the engine 8, or commands the throttle actuator 64 to reduce the opening angle of the throttle valve 62 for reducing the amount of supply of the air-fuel mixture to the engine 8. In addition, the first-electric-motor-speed control means 92 controls the operating speed $N_{M1}$ of the first electric motor M1 such that the rotating speed $N_{M2}$ does not exceed the predetermined upper limit $N_{M2max}$.

In the speed limiting control routine illustrated in the flow chart of FIG. 14, step S2' is provided to determine whether the rotating-speed ratio $R_N$ (=$N_{IN}$1/$N_{IN}$2) is higher than the predetermined threshold value $R_NA$. If an affirmative determination is obtained in step S2', the control flow goes to the step S3 corresponding to the engine-output limiting means 90 and the step S4 corresponding to the first-electric-motor-speed control means 92, as in the first, second and third embodiments, so that the engine-output limiting means 90 and the first-electric-motor-speed control means 92 effectively reduce or prevent the excessive rise of the rotating speed of the rotary member of the automatic transmission portion 20 disposed on one side of the input clutch C1, C2 nearer to the engine 8, and the excessive rises of the rotating speeds of the bearing rotated with the rotary member and the second electric motor M2, thereby making it possible to assure high durability of those rotary member, bearing and electric motor. These functions of the electronic control device 80 of the present fourth embodiment is particularly advantageous for the vehicular transmission mechanism or drive system 10 that has the reduced axial dimension and a plurality of gear positions which have respective speed ratios (close to each other and changing over a wide range) and which are established by a plurality of input clutches in the form of the first and second clutches C1, C2.

Figure 15:
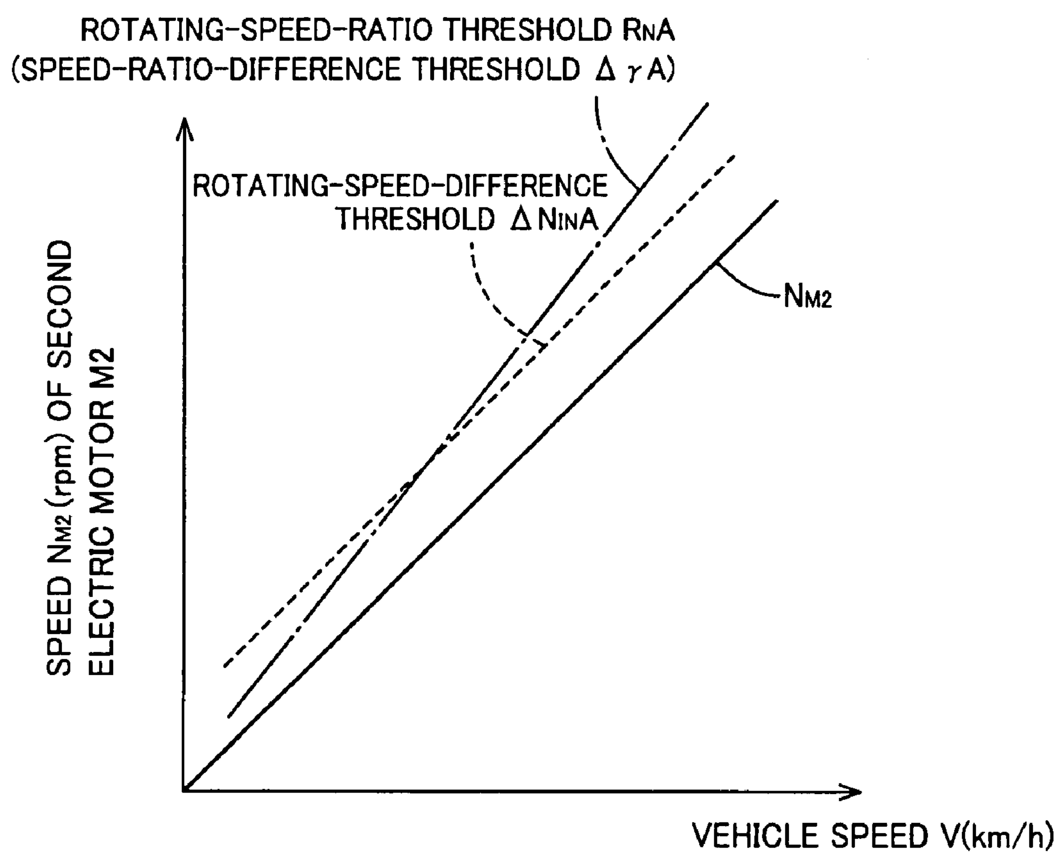
FIG. 15 is a view indicating a threshold value used by rotating-speed-ratio determining means in the embodiment of FIG. 13 and a threshold value used speed-ratio-difference determining means in a still further embodiment of FIG. 16, in comparison with a threshold value used by rotating-speed-difference determining means in the embodiment of FIG. 7, in a two-dimensional coordinate system wherein vehicle speed is taken along a horizontal axis while rotating speed of second electric motor is taken along a vertical axis.

In the present fourth embodiment, the rotating-speed-ratio determining means 88' is configured to determine whether the rotating-speed ratio $R_N$ of the actual rotating speed $N_{IN}$1 of the input member of the automatic transmission portion 20 to the theoretical input-member speed $N_{IN}$2 (=γ×$N_{OUT}$) is higher than the predetermined threshold value $R_NA$. FIG. 15 is a view indicating the rotating speed $N_{M2}$ of the second electric motor M2 (which is equal to the above-indicated rotating speed $N_{IN}$1), the threshold value $\Delta N_{IN}A$ of the rotating-speed difference $\Delta N_{IN}$ in the first, second and third embodiments, and the threshold value $R_NA$ of the rotating-speed ratio $R_N$ in the present fourth embodiment, in the two-dimensional coordinate system wherein the rotating speed $N_{M2}$ of the second electric motor M2 and the vehicle speed V when the first and second input clutches C1, C2 are normal while the automatic transmission portion 20 is placed in a given gear position are taken along the respective vertical and horizontal axes. Solid line represents the rotating speed $N_{M2}$, and broken line represents the threshold value $\Delta N_{IN}A$, while one-dot chain line represents the threshold value $R_NA$.

Fifth Embodiment

Figure 16:
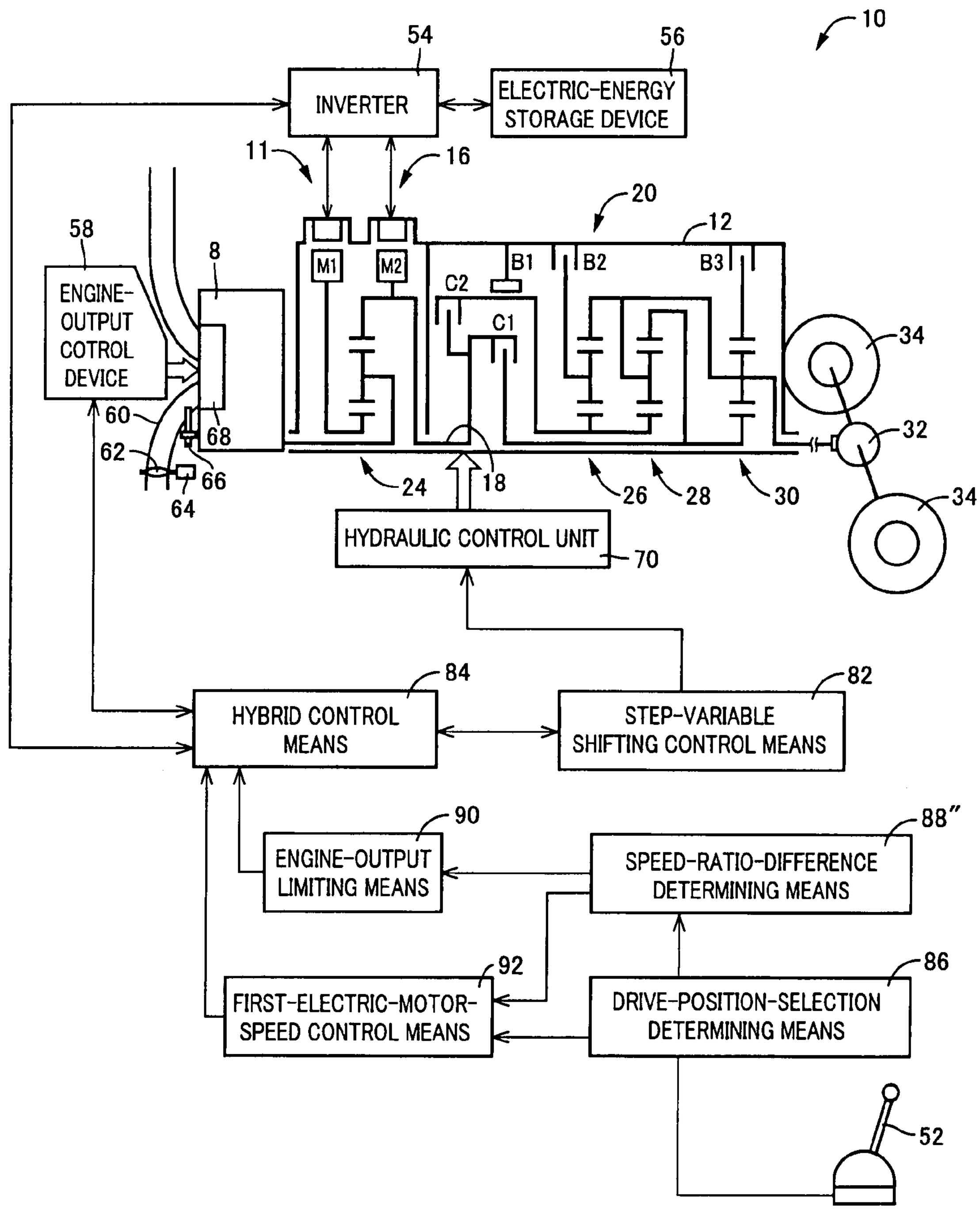
FIG. 16 is a functional block diagram corresponding to that of FIG. 7, illustrating major control functions of an electronic control device according to the above-indicated still further embodiment of this invention.
Figure 17:
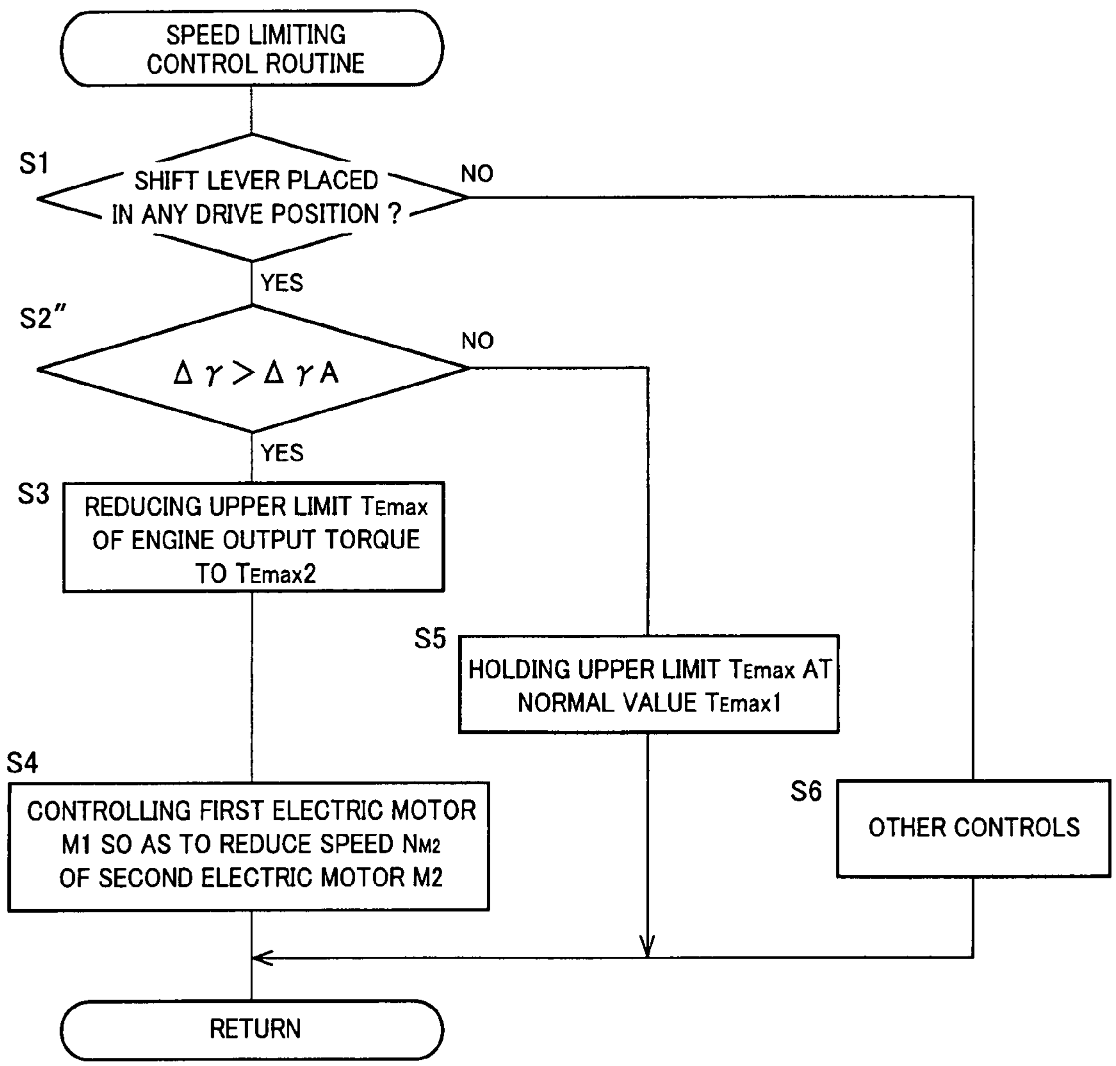
FIG. 17 is a flow chart illustrating a speed limiting control routine executed by the electronic control device shown in FIG. 16.

Referring to FIGS. 16 and 17, there will be described a fifth embodiment of this invention. FIG. 16 is a block diagram illustrating major control functions of the electronic control device 80 according to the fifth embodiment configured to prevent an excessive rise of the rotating speed of the second electric motor M2 due to abnormal reduction of the torque capacity of the input clutch C1 and/or the input clutch C2. FIG. 17 is a flow chart illustrating a speed limiting control routine executed by the electronic control device 80 shown in FIG. 16. The electronic control device 80 of FIG. 16 according to the fifth embodiment is identical with that of FIG. 7 according to the first, second and third embodiments, except that speed-radio-difference determining means 88" is provided in place of the rotating-speed-difference determining means 88. The speed limiting control routine of FIG. 17 is identical with that of FIG. 11, except that step S2" corresponding to the speed-ratio-difference determining means 88" is provided in place of step S2 corresponding to the rotating-speed-difference determining means 88. Therefore, only the speed-ratio-difference determining means 88" and the step S2" will be described.

The speed-ratio-difference determining means 88" is operated when the shift lever 52 is placed in any drive position, and is configured to determine whether a speed-ratio difference Δγ (=γ1 - γ02) is larger than a predetermined threshold value ΔγA. The speed-ratio difference Δγ is a difference between an actual speed ratio γ1 (=$N_{IN}$1/$N_{OUT}$) and a theoretical speed ratio (nominal speed ratio) γ2 corresponding to the presently established gear position of the automatic transmission portion 20. The actual speed ratio γ1 is obtained on the basis of the actual rotating speed of the power transmitting member 18 (output member of the differential portion or electric continuously-variable transmission portion 11), which is calculated on the basis of then output signal of the resolver incorporated in the second electric motor M2, namely, the actual rotating speed $N_{IN}$1 of the input rotary member of the automatic transmission portion (mechanical power transmitting portion) 20, and on the basis of the actual vehicle speed V (speed $N_{OUT}$ of the output shaft 22). Like the threshold value $\Delta N_{IN}$A of the rotating-speed difference $\Delta N_{IN}$, the threshold value ΔγA of the speed ratio difference Δγ is determined as an upper limit above which the control to limit the output torque of the engine 8 is initiated to prevent an excessive rise of the rotating speed of the second electric motor M2.

When the speed-ratio difference determining means 88" has determined that the speed-ratio difference Δγ (=γ1/γ2) is larger than the predetermined threshold value ΔγA, the engine-output limiting means 90 limits the output torque $T_E$ of the engine 8 to the reduced upper limit value $T_{Emax2}$ (N·m) which is smaller than the normal upper limit value $T_{Emax1}$ (N·m) used when the speed-ratio difference Δγ is not larger than the predetermined threshold value ΔγA, as in the case of FIG. 10, so that the engine-output control device 58 commands the fuel injecting device 66 to effect the fuel cut of the engine 8, that is, to inhibit the fuel supply to the engine 8, or commands the throttle actuator 64 to reduce the opening angle of the throttle valve 62 for reducing the amount of supply of the air-fuel mixture to the engine 8. In addition, the first-electric-motor-speed control means 92 controls the operating speed $N_{M1}$ of the first electric motor M1 such that the rotating speed $N_{M2}$ does not exceed the predetermined upper limit $N_{M2max}$.

In the speed limiting control routine illustrated in the flow chart of FIG. 17, step S2" is provided to determine whether the speed ratio difference Δγ (=γ1 - γ2) is larger than the predetermined threshold value ΔγA. If an affirmative determination is obtained in step S2", the control flow goes to the step S3 corresponding to the engine-output limiting means 90 and the step S4 corresponding to the first-electric-motor-speed control means 92, as in the preceding embodiments, so that the engine-output limiting means 90 and the first-electric-motor-speed control means 92 effectively reduce or prevent the excessive rise of the rotating speed of the rotary member of the automatic transmission portion 20 disposed on one side of the input clutch C1, C2 nearer to the engine 8, and the excessive rises of the rotating speeds of the bearing rotated with the rotary member and the second electric motor M2, thereby making it possible to assure high durability of those rotary member, bearing and electric motor. These functions of the electronic control device 80 of the present fifth embodiment is particularly advantageous for the vehicular transmission mechanism or drive system 10 that has the reduced axial dimension and a plurality of gear positions which have respective speed ratios (close to each other and changing over a wide range) and which are established by a plurality of input clutches in the form of the first and second clutches C1, C2.

In the present fifth embodiment, the rotating-speed-ratio determining means 88" is configured to determine whether the speed ratio difference Δγ (=γ1 - γ2) between the actual speed ratio γ1 (=$N_{IN}$1/$N_{OUT}$) and the theoretical speed ratio (nominal speed ratio) γ2 corresponding to the presently established gear position of the automatic transmission portion 20 is larger than the predetermined threshold value ΔγA. One-dot chain line in FIG. 15 indicates, in the two-dimensional coordinate system, the rotating speed $N_{M2}$ of the second electric motor M2 (which is equal to the above-indicated rotating speed $N_{IN}$1) and the vehicle speed V when the first and second input clutches C1, C2 are normal while the automatic transmission portion 20 is placed in a given drive position.

Sixth Embodiment

In the present sixth embodiment, the engine-output limiting means 90 and the first-electric-motor-speed determining means 92 are operated to limit the output torque $T_E$ of the engine 8 and the first electric motor M1 when the affirmative determination is obtained in step S2 of the speed limiting control routine of FIG. 11 by the rotating-speed-difference determining means 88 while the vehicle speed V is lower than a predetermined threshold value V1. While the vehicle speed V is not lower than the threshold value V1, the engine-output limiting means 90 and the first-electric-motor-speed determining means 92 are operated to limit the output torque $T_E$ of the engine 8 and the first electric motor M1 when the affirmative determination is obtained in step S2' of the speed limiting control routine of FIG. 14 by the rotating-speed-ratio determining means 88', or in step S2" of the speed limiting control routine of FIG. 17 by the speed-ratio-difference determining means 88".

Figure 18:
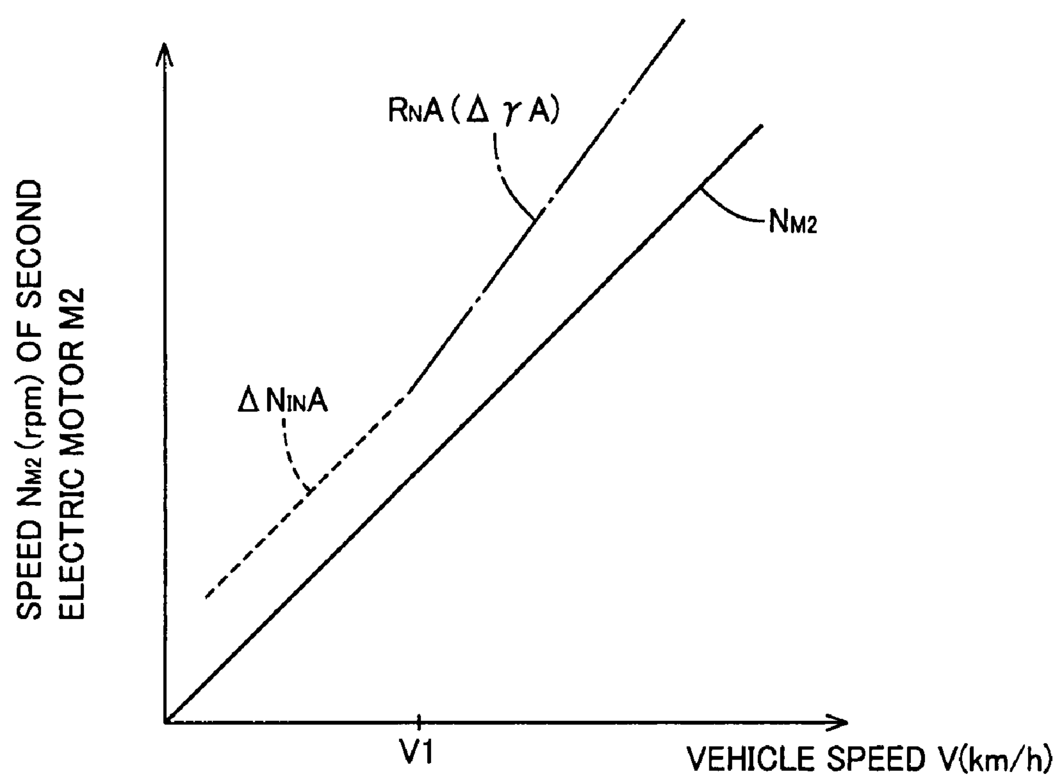
FIG. 18 is a view corresponding to that of FIG. 15, showing a yet further embodiment of the invention.

In the two-dimensional coordinate system of FIG. 18, the rotating speed $N_{M2}$ of the second electric motor M2 and the vehicle speed V (km/h) when the first and second input clutches C1, C2 are normal while the automatic transmission portion 20 is placed in a give drive gear position are taken along the respective vertical and horizontal axes. Solid line indicates the rotating speed $N_{IN}$1, and broken line indicates the threshold value $\Delta N_{IN}$A of the rotating-speed difference $\Delta_{NI}$N above which the output torque $T_E$ of the engine 8 is limited when the vehicle speed V is lower than the threshold value V1, while one-dot chain line indicates the threshold value $R_N$A of the rotating-speed ratio $R_N$ or the threshold value $\Delta\gamma A$ of the speed-ratio difference $\Delta\gamma$ above which the engine output torque $T_E$ is limited, when the vehicle speed V is not lower than the threshold value V1. In this embodiment, the engine-output limiting means 90 is less likely to be influenced by a noise during running of the vehicle at a relatively low speed, and the reduction of the output torque $T_E$ of the engine 8 can be initiated at a suitable time to prevent or reduce an excessive rise of the speed of the second electric motor M2 due to a slipping action of the input clutch C1 and/or C2 during running of the vehicle at a relatively high speed.

While the preferred embodiments of this invention have been described in detail by reference to the accompanying drawings, it is to be understood that the present invention may be otherwise embodied.

In the illustrated embodiments, the automatic transmission portion 20 of the transmission mechanism 10 is a step-variable transmission having the four forward drive gear positions. However, the automatic transmission portion 20 may have any number of forward drive gear positions. Further, the automatic transmission portion 20 may be replaced by a belt-and-pulley type continuously-variable transmission which has a pair of variable-diameter pulleys connected to each other by a belt and the speed ratio of which is continuously variable. In this belt-and-pulley type continuously-variable transmission, power is transmitted by a frictional contact of the pair of variable-diameter pulleys with the belt, so that it is possible to prevent an excessively high operating speed of the second electric motor M2 due to abnormal reduction of the power transmission capacity of the frictionally engaging portions of the pulleys and belt. In this case, the pulleys and the belt function as the coupling device.

In the illustrated embodiments, at least one the first clutch C1 and the second clutch C2 functions as the coupling device of the mechanical power transmitting portion in the form of the automatic transmission portion 20. However, the coupling device provided in the mechanical power transmitting portion may be of any other type such as a powder type, an electromagnetic type and a mechanical meshing type, such as a powder clutch, an electromagnetic clutch and a meshing type dog clutch.

In the power distributing mechanism 16 in the illustrated embodiments, the first carrier CA1 is fixed to the engine 8, and the first sun gear S1 is fixed to the first electric motor M1 while the first ring gear R1 is fixed to the power distributing member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

While the second electric motor M2 is connected to the power transmitting member 18 in the illustrated embodiments, the second electric motor M2 may be connected to a rotary member disposed in a power transmitting path between the power transmitting member 18 and the drive wheels 34, for example, to the output shaft 22.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

The electric differential portion 11 functioning as the continuously-variable transmission portion in the illustrated embodiments may be operable as a step-variable transmission portion by controlling the first electric motor M1.

It is to be understood that the embodiments of the invention have been described for illustrative purpose only, and that the present invention may be embodied with various changes and modifications which may occur to those skilled in the art.

What is claimed is:

1. A control apparatus for a vehicular drive system including an electric differential portion and a mechanical power transmitting portion which are disposed in series in a power transmitting path between an engine and a drive wheel of a vehicle, said control apparatus being configured to limit an output of said engine according to a difference between an actual rotating speed of said mechanical power transmitting portion, and a theoretical rotating speed estimated from a presently established speed ratio of the mechanical power transmitting portion;

wherein said electric differential portion includes a differential mechanism operable to distribute the output of said engine to a first electric motor and an input shaft of said mechanical power transmitting portion, and a second electric motor connected to said input shaft, said control apparatus comprises first-electric-motor-speed control means configured to control a rotating speed of said first electric motor such that a rotating speed of said second electric motor does not exceed a predetermined upper limit.

2. The control apparatus according to claim 1, comprising engine-output limiting means configured to limit the output of the engine such that an upper limit value of said output is smaller when said difference is larger than a predetermined threshold, than when said difference is not larger than said predetermined threshold value.

3. The control apparatus according to claim 2, wherein a normal upper limit value of said upper limit value is set not less than a maximum value of the engine output torque.

4. The control apparatus according to claim 2, wherein a reduced upper limit value is set in advance, as an upper limit below which an excessive rotation of the second electric motor is prevented even upon occurrence of an excessive slipping action in the mechanical power transmitting portion of a clutch due to abnormity.

5. The control apparatus according to claim 1, wherein said electric differential portion includes an electric motor and is operable as an electrically controlled continuously-variable transmission while an operating state of said electric motor is controlled.

6. The control apparatus according to claim 1, wherein said mechanical power transmitting portion is a step-variable or continuously-variable transmission device including a coupling device which selectively permits and inhibits power transmission through the transmission device.

7. The control apparatus according to claim 1, wherein said mechanical power transmitting portion is automatically shifted in accordance with a shifting lines using an output torque and a vehicle speed as parameters.

8. The control apparatus according to claim 1, wherein a predetermined threshold value for a rotating speed difference is set, as an upper limit above which the control to limit the output torque of said engine is initiated to prevent an excessive rotation of the second electric motor.

9. A control apparatus for a vehicular drive system including an electric differential portion and a mechanical power transmitting portion which are disposed in series in a power transmitting path between an engine and a drive wheel of a vehicle, said control apparatus being configured to limit an output of said engine according to a ratio of an actual rotating speed of said mechanical power transmitting portion to a theoretical rotating speed estimated from a presently established speed ratio of the mechanical power transmitting portion;

wherein said electric differential portion includes a differential mechanism operable to distribute the output of said engine to a first electric motor and an input shaft of said mechanical power transmitting portion, and a second electric motor connected to said input shaft, said control apparatus comprises first-electric-motor-speed control means configured to control a rotating speed of said first electric motor such that a rotating speed of said second electric motor does not exceed a predetermined upper limit.

10. The control apparatus according to claim 9, comprising engine-output limiting means configured to limit the output of the engine such that an upper limit value of said output is smaller when said ratio is higher than a predetermined threshold, than when said ratio is not larger than said predetermined threshold value.

11. The control apparatus according to claim 10, wherein a normal upper limit value of said upper limit value is set not less than a maximum value of the engine output torque.

12. The control apparatus according to claim 10, wherein a reduced upper limit value is set in advance, as an upper limit below which an excessive rotation of the second electric motor is prevented even upon occurrence of an excessive slipping action in the mechanical power transmitting portion of a clutch due to abnormity.

13. The control apparatus according to claim 9, wherein said electric differential portion includes an electric motor and is operable as an electrically controlled continuously-variable transmission while an operating state of said electric motor is controlled.

14. The control apparatus according to claim 9, wherein said mechanical power transmitting portion is a step-variable or continuously-variable transmission device including a coupling device which selectively permits and inhibits power transmission through the transmission device.

15. The control apparatus according to claim 9, wherein said mechanical power transmitting portion is automatically shifted in accordance with a shifting lines using an output torque and a vehicle speed as parameters.

16. The control apparatus according to claim 9, wherein a predetermined threshold value for a rotating speed difference is set, as an upper limit above which the control to limit the output torque of said engine is initiated to prevent an excessive rotation of the second electric motor.

17. A control apparatus for a vehicular drive system including an electric differential portion and a mechanical power transmitting portion which are disposed in series in a power transmitting path between an engine and a drive wheel of a vehicle, said control apparatus being configured to limit an output of said engine according to a difference of an actual speed ratio of said mechanical power transmitting portion from a theoretical speed ratio of the mechanical power transmitting portion;

wherein said electric differential portion includes a differential mechanism operable to distribute the output of said engine to a first electric motor and an input shaft of said mechanical power transmitting portion, and a second electric motor connected to said input shaft, said control apparatus comprises first-electric-motor-speed control means configured to control a rotating speed of said first electric motor such that a rotating speed of said second electric motor does not exceed a predetermined upper limit.

18. The control apparatus according to claim 17, comprising engine-output limiting means configured to limit the output of the engine such that an upper limit value of said output is smaller when said difference is larger than a predetermined threshold, than when said difference is not larger than said predetermined threshold value.

19. The control apparatus according to claim 18, wherein a normal upper limit value of said upper limit value is set not less than a maximum value of the engine output torque.

20. The control apparatus according to claim 18, wherein a reduced upper limit value is set in advance, as an upper limit below which an excessive rotation of the second electric motor is prevented even upon occurrence of an excessive slipping action in the mechanical power transmitting portion of a clutch due to abnormity.

21. The control apparatus according to claim 17, wherein said electric differential portion includes an electric motor and is operable as an electrically controlled continuously-variable transmission while an operating state of said electric motor is controlled.

22. The control apparatus according to claim 17, wherein said mechanical power transmitting portion is a step-variable or continuously-variable transmission device including a coupling device which selectively permits and inhibits power transmission through the transmission device.

23. The control apparatus according to claim 17, wherein said mechanical power transmitting portion is automatically shifted in accordance with a shifting lines using an output torque and a vehicle speed as parameters.

24. The control apparatus according to claim 17, wherein a predetermined threshold value for a rotating speed difference is set, as an upper limit above which the control to limit the output torque of said engine is initiated to prevent an excessive rotation of the second electric motor.

* * * * *